United States Patent
Rambhia et al.

(10) Patent No.: US 8,832,147 B2
(45) Date of Patent: Sep. 9, 2014

(54) RELATIONAL META-MODEL AND ASSOCIATED DOMAIN CONTEXT-BASED KNOWLEDGE INFERENCE ENGINE FOR KNOWLEDGE DISCOVERY AND ORGANIZATION

(71) Applicant: Knf Technologies, Inc., San Martin, CA (US)

(72) Inventors: Ajay Manoj Rambhia, Sacramento, CA (US); Henri P. Wiazowski, San Jose, CA (US); Reginald L. Bravo, San Martin, CA (US)

(73) Assignee: KNF Technologies, Inc., San Martin, CA (US)

( * ) Notice: Subject to any disclaimer, the term of this patent is extended or adjusted under 35 U.S.C. 154(b) by 0 days.

(21) Appl. No.: 14/188,446

(22) Filed: Feb. 24, 2014

(65) Prior Publication Data

US 2014/0172770 A1    Jun. 19, 2014

Related U.S. Application Data

(63) Continuation of application No. 13/596,539, filed on Aug. 28, 2012, now Pat. No. 8,700,658.

(60) Provisional application No. 61/530,356, filed on Sep. 1, 2011.

(51) Int. Cl.
*G06F 17/30* (2006.01)
*G06N 5/04* (2006.01)

(52) U.S. Cl.
CPC .... *G06F 17/30595* (2013.01); *G06F 17/30592* (2013.01); *G06N 5/046* (2013.01); *G06F 17/30* (2013.01); *G06F 17/30477* (2013.01); *G06F 17/30542* (2013.01)
USPC ........... 707/769; 707/706; 707/713; 707/722; 707/736; 707/758; 707/759; 707/781; 707/791; 707/802; 706/61; 717/168

(58) Field of Classification Search
USPC ......... 707/706, 713, 722, 736, 758, 759, 769, 707/781, 791, 802, 999.1, 999.003; 706/61; 717/168
See application file for complete search history.

(56) References Cited

U.S. PATENT DOCUMENTS

| | | | |
|---|---|---|---|
| 2004/0153435 A1* | 8/2004 | Gudbjartsson et al. | 707/1 |
| 2004/0186826 A1* | 9/2004 | Choi et al. | 707/3 |
| 2008/0077598 A1* | 3/2008 | Wilmering et al. | 707/100 |

\* cited by examiner

*Primary Examiner* — Syling Yen
(74) *Attorney, Agent, or Firm* — Ascenda Law Group, PC

(57) ABSTRACT

Methods and systems for knowledge discovery and organization employ a relational meta model and domain context-based knowledge inference engine to produce answers to queries that involve inferences among items stored as knowledge in a knowledgebase.

9 Claims, 24 Drawing Sheets

RELATIONAL META-MODEL AND ASSOCIATED DOMAIN CONTEXT-BASED KNOWLEDGE INFERENCE ENGINE FOR KNOWLEDGE DISCOVERY AND ORGANIZATION

RELATED APPLICATIONS

This application is a CONTINUATION of U.S. application Ser. No. 13/596,539 filed Aug. 28, 2012 which is a NONPROVISIONAL of and claims priority to U.S. Provisional Application No. 61/530,356, filed Sep. 1, 2011, the contents of which are incorporated herein by reference.

FIELD OF THE INVENTION

The present invention relates to methods and systems for knowledge discovery and organization, and, in particular, to such systems and methods as employ a relational meta model and a domain context-based knowledge inference engine.

BACKGROUND

Relational databases organize data into tables of rows and columns according to strictly defined rules. Columns are typically related by way of a key and these relationships are subject to certain restraints. When a user submits a query, these rules, keys, and constraints are used to search through information stored in the relational database to find data that matches the query. However, such searches are limited to literal interpretations of the query and the literal application of the rules, keys, and constraints to the data stored within the relational database. Consequently, certain relationships between the stored data and the query are missed because they are not literally correlated to the query or how the data is classified or categorized within the relational database using the rules, keys, and constraints.

SUMMARY OF THE INVENTION

Embodiments of the invention provide methods and systems for knowledge discovery and organization, in particular such systems and methods as employ a relational meta model and domain context-based knowledge inference engine. The present invention finds particular application where inferences involving items stored as knowledge in a knowledgebase (e.g., a meta detect data store) are required. The items may be discovered through accesses to remote data stores. Thus, the present invention provides a system with learning capabilities—i.e., inferences based on data become available even though the original knowledge stores housing such data may not have provided such capabilities. Further, since the present system uses a discovered meta model to correlate unrelated data using genetic algorithms by finding disjointed relationships, it exhibits intelligence to accommodate variations in datasets and types of data values to derive dynamic results in the form of resultant datasets. Finally, the present system is inherently scalable inasmuch as whenever an input query or keywords cannot be resolved, the system requests external input to provide clarification. These clarifications can be in form of computational/arithmetic expressions or proportionality functions, which are stored in the knowledgebase.

BRIEF DESCRIPTION OF THE DRAWINGS

The present application is illustrated by way of example, and not limitation, in the figures of the accompanying drawings, in which.

Figure 1:
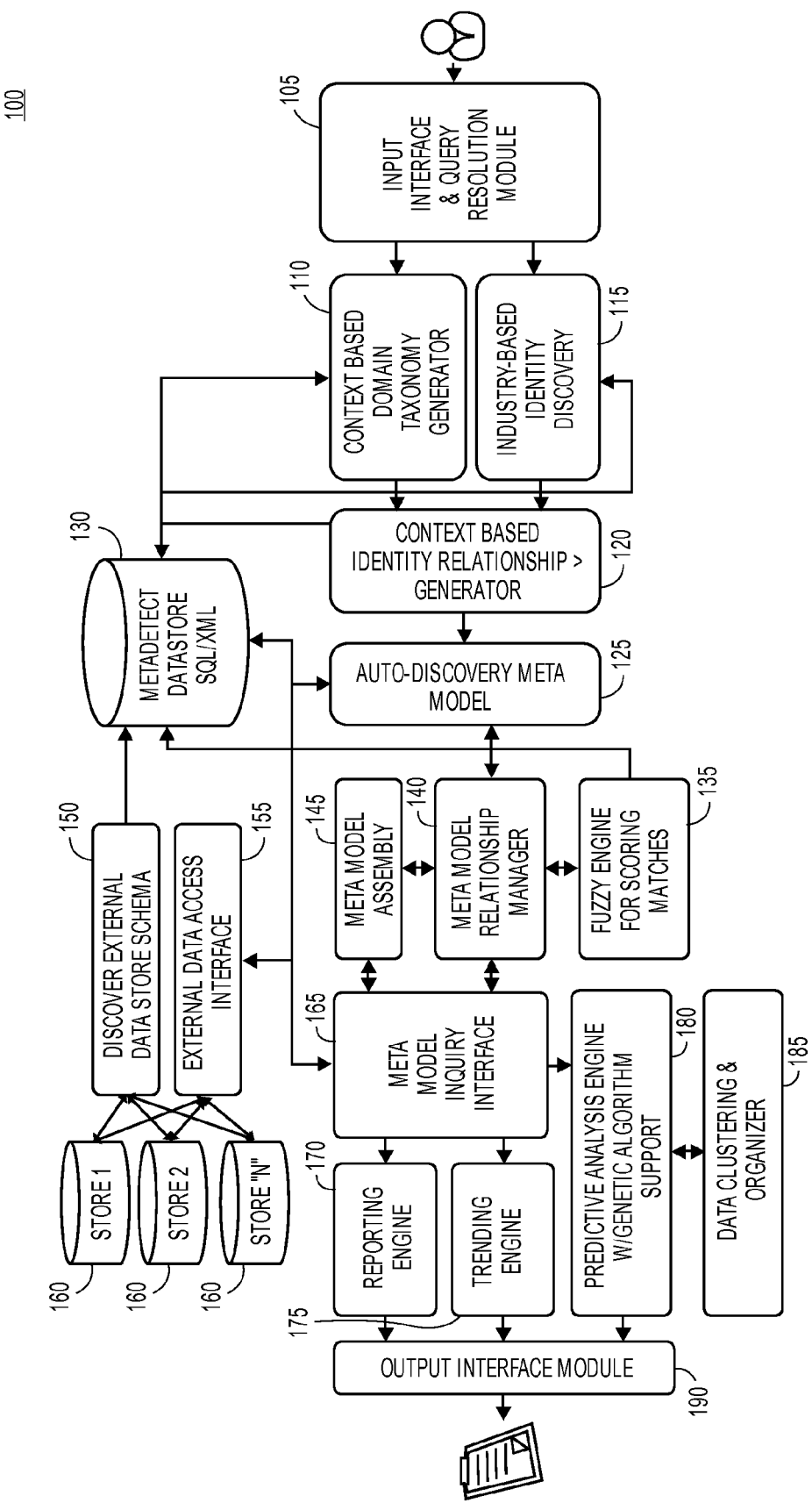
FIG. 1 is a block diagram illustrating an exemplary system for knowledge inference, in accordance with an embodiment of the present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

FIG. 1 illustrates an example of a system or knowledge inference engine 100 configured, in accordance with embodiments of the present invention, with a meta model inquiry interface 165 and a meta detect data store 130 for use in knowledge discovery and related applications. The system 100 is configured to respond to user inputs, for example requests or queries, by processing the query and information included therein to obtain available data from the meta model and generate suitable results responsive to the query. In doing so, the system employs a number of different processor-based modules or engines that interface with input and output modules. The nature of the queries can be described as inquiries on data, and usually arrive in the form of informal questions that will have a distinct format and layout.

The present system utilizes a relational meta model which organizes and stores information in multiple dimensions organized in a hierarchical fashion. The meta model is an assembly of meta names, their aliases and dependent terms, along with relationship information associating the terms to one another, that collectively describe a meta data schema. The present invention utilizes the associations specified in the meta data schema to derive inferences. For example, the knowledge inference engine 100 will infer and extract knowledge based on a descriptor or combination of descriptors that are part of the meta data schema. The meta data schema provides the domain that is being addressed and the context to address it.

The dataset on which the knowledge inference engine 100 operates is defined by a set of keywords. As described in detail below, the keywords form the meta model that describes the underlying information. The keywords and their associations with one another are discovered dynamically, for example from Web-based data sources or other data sources. By dynamically building a set of associations among keywords from information included in different data sources, the present system is able to respond to queries even if the queries themselves do not employ terms that are themselves keywords in a particular dataset. That is, the meta data schema into which the dataset is organized allows the knowledge inference engine 100 to processes, infer and derive knowledge (i.e., responses to inquiries) from the dataset, whether or not the terms used in the queries match particular keywords.

Before discussing the present system in detail it is important to recognize that embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose. In view of the above, it should be appreciated that some portions of the description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It will prove convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of an appropriately programmed computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with one or more apparatus to perform the operations described herein. This apparatus may be specially constructed for the required purposes, or it may comprise a computer system that is selectively activated or reconfigured by a computer program which it executes and which is stored on one or more computer-readable storage mediums accessible to processing elements of the computer system. For example, such a computer program may be stored in a computer readable storage medium, such as, but not limited to, any type of disk including floppy disks, optical disks, compact disk read only memories (CD-ROMs), and magnetic-optical disks, read-only memories (ROMs), flash drives, random access memories (RAMs), erasable programmable read only memories (EPROMs), electrically erasable programmable read only memories (EE-PROMs), flash memories, hard drives or other forms of magnetic or optical storage media, or any type of media suitable for storing electronic instructions, and each accessible to a computer processor, e.g., by way of a system bus or other communication means.

The algorithms and processes presented herein are not inherently related to any particular computer system, processor or other apparatus. Various electronic computing apparatus, along with, where necessary, suitable computer programs that instantiate processes in accordance with the teachings herein, may be used. For example, any of the present methods can be implemented in hard-wired circuitry, by appropriate programming of a computer processor or processors, or any combination of hardware and software may be used to carry out the methods discussed below. Of course, the invention can be practiced with computer system configurations other than those particularly described below, including systems that comprise hand-held devices, multiprocessor systems, microprocessor-based electronic devices, digital signal processor-based devices, networked computer systems, minicomputers, mainframe computers, personal computers, and the like, and it should be recognized that these examples presented herein are used merely for purposes of illustration. The invention can also be practiced in distributed computing environments where tasks are performed by computer processing devices that are remote to one another, either physically and/or logically, and are linked through one or more communications networks. The required structure for a variety of these systems will appear from the description below.

For purposes of example, one form of computer system which may be configured in accordance with embodiments of the invention includes a bus or other communication mechanism for communicating information, and a processor coupled with the bus for processing information. Such a computer system also includes a main memory, such as a RAM or other dynamic storage device, coupled to the bus for storing information and instructions to be executed by the processor. The main memory also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to the bus for persistent storage of information and instructions.

The computer system may be coupled via the bus to a display, such as a liquid crystal display (LCD), light emitting diode (LED) display or other display device, for displaying information to a computer user. An input device, typically including alphanumeric and other keys, is usually coupled to the bus for communicating information and command selections to the processor. Another type of user input device for cursor control, such as a mouse, a trackball, or cursor direction keys, may also be present for communicating direction information and command selections to the processor and for controlling cursor movement on the display.

The computer system operates in response to the processor executing sequences of instructions contained in the main memory. Such instructions may be read into the main memory from another computer-readable medium, such as the persistent storage device. Execution of the sequences of instructions contained in the main memory causes the processor to perform the process steps described below. In alternative embodiments, hard-wired circuitry may be used in place of or in combination with computer software instructions to implement the invention. Thus, embodiments of the invention are not limited to any specific combination of hardware circuitry and software.

The computer system may also include a communication interface coupled to the bus. The communication interface provides two-way data communication for the computer system across one or more networks, for example via a wired or wireless communication interface. The network may be a local area network (LAN) which itself is coupled to one or more other networks and other computer-based devices and/or data stores. For example, the computer system may be coupled to data equipment operated by an Internet Service Provider (ISP), which in turn provides data communication services through the Internet. Thus, the computer system can send and receive messages and data, including program code, through its communication interface.

With the above in mind, we return to a discussion of the system illustrated in FIG. 1. Above, it was noted that the system is configured to respond to and process queries. The query may be classified as an inquiry, one that is inference-based or one that is forecast-based. Depending on its type, the query will trigger one or more computer-executed processes to formulate and/or explore the meta model, use it to gather data from one or more data sources, and ultimately present it to a user in a selected or determined format. The various engines, namely the reporting, trending and predictive analysis engines, 170, 175 and 180, respectively, illustrated in FIG. 1 operate on the extracted data to produce the desired result. The result, in this case, may be presented as a printed output (e.g., a tabular sheet, graph, or stream comprising multiple numeric and/or character values) and/or a visual output on a display. In some instances, the output may be or may include an electronic message, such as an e-mail or text message, which is sent to one or more recipients.

In the next section, the relational meta model used by the present system is described.

Meta Model and Relational Meta Model

Figure 2:
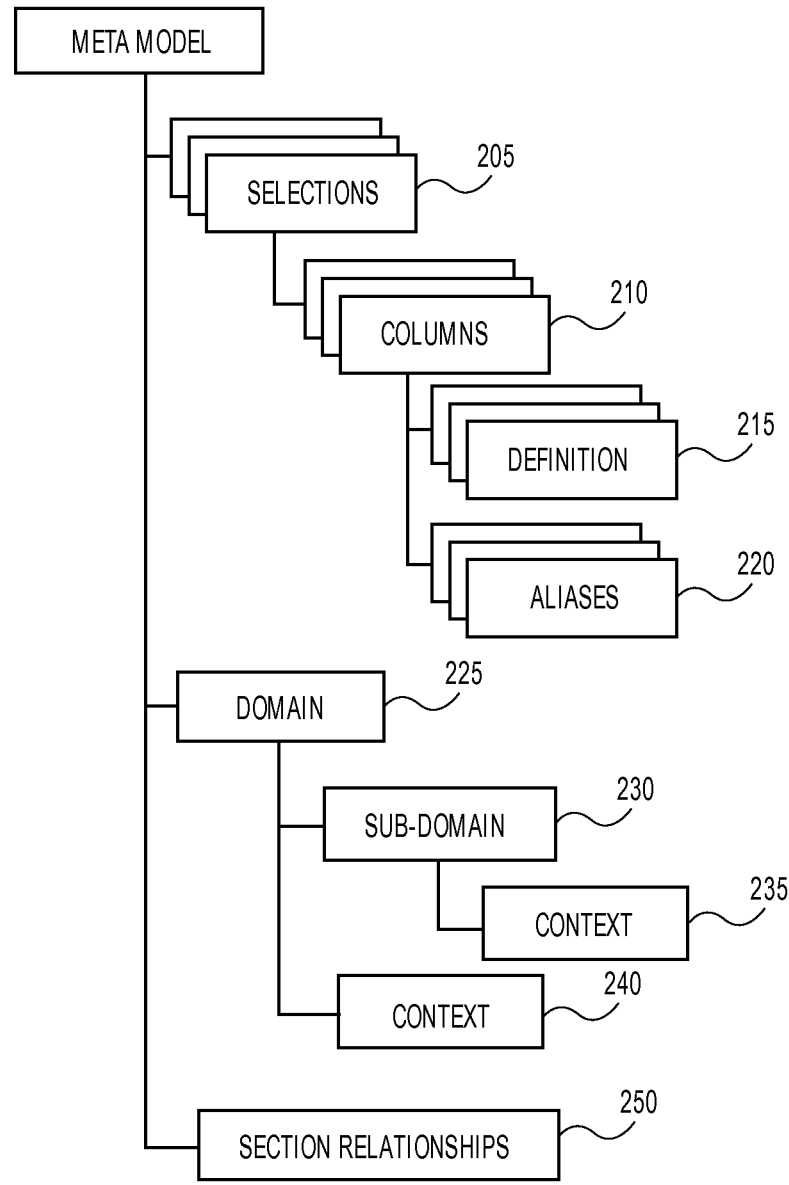
FIG. 2 is a block diagram illustrating an exemplary meta model for use in connection with a knowledge inference engine configured in accordance with an embodiment of the present invention.

As indicated above, the present system employs a relational meta model to derive answers to queries. In one instance, the meta model may include one or more charts (e.g., tables or other two-dimensional data structures), each with several columns having titles. The titles describe the contents of the respective columns and, hence, describe the data. A single meta model can include several charts, which may be related to one another by way of one or more relationships. FIG. 2 illustrates an example of a meta model 200.

As shown in the illustration, a section 205 is used to allow meta model 200 to store several two-dimensional data structures. A single meta model 200 may include several sections 205, each of which comprises one or more columns 210 (also called members). Each member 210 includes one or more associated definitions 215 and/or aliases 220 which describe and/or define the member. The aliases 220 may be synonyms describing a respective column 210 in a business context. Note also that a meta model 200 will be always associated with a domain 225, as in a business domain or industry, and, optionally, one or more sub-domains 230 therein. For example, a particular meta model 200 may be associated with a healthcare industry domain and an insurance processing sub-domain within the healthcare industry domain. Further, each domain 225 or sub-domain 230 may have an optional context 235, 240 that is an attribute that qualifies the respective sub-domain 230 or domain 225. Continuing the previous example, the insurance processing sub-domain within the healthcare domain may have an insurance billing context.

Finally, since a single meta model 200 can comprise several sections 205, the sections 205 may be associated with one another via a relationship 250. The section relationship 250 attribute in the meta model 200 allows for storing any inter-relationship information between the sections 205. Such relationships 250 come in several varieties. For example, one section 205 can be related to another section 205 by a column 210. Note that this is different than a relational database schema where columns can be related only by ways of keys and these relationships can have a constraint. In the present meta model 200, the section relationships 250 can include a column association, but can also specify a loosely coupled relation. The loosely coupled relation can be described using a proportionality expression or even an arithmetic expression or set qualifications such as 'can contain,' 'must contain,' etc. As an example, a relationship can be stated as:

Column 1 of Section 1 is ALWAYS inversely proportional to Column 2 of Section 4.

The enforcement or validation of this relationship, when carried out, will ensure that as the data values in Column 2 of Section 4 increase, the values in Column 1 of Section 1 decrease, and vice-versa.

By way of further example, a relationship 250 can involve multiple sections, such as:

Column 1 of Section 1 is RELATED TO Column 2 of section 3 AND Column 3 of Section 4 BY expression:

Column 1 of Section 1:=Column 2 of Section 3+Column 3 of Section 4.

Note that the system will allow for relationship imposition based on trends of the data, including individual data values typical to current relational database systems.

Meta Model Generations

In some embodiments, meta models may occur in multiple generations and may be categorized into, for example, a base meta model, second generation meta model, third generation meta model, etc. Each generation may have a specified relationship to its prior generation(s).

By definition, the base meta model will be the first generation meta model defined in system 100, either by a user or as derived from an existing database or data store, such as data store 160. As indicated in FIG. 1, the data store schema may be auto-discovered, for example using an access bridge (e.g., an ODBC/JDBC bridge or similar construct) or using an application programming interface (API) that exposes data store 160 (e.g., in extensible markup language (XML) format). A discover external data source schema component 150 of system 100 may thus retrieve the data store schema, assemble it, e.g., in XML format, and push it into the meta detect data store 130. The flowchart shown in FIG. 3A describes a process 300 used by discover external data source schema component 150 to retrieve a data store schema with all of its attributes from an external data source via an external data access interface 155, such as one or more of data stores 160.

At the outset, it may be determined whether a data source interface is available (step 302) and, if not, it may be further determined whether data to be processed is in a free-text form, ASCII, or EDI format (step 304). When the data is in a free-text form, ASCII, or EDI format, a textual data discovery process, such as process 301 as described below with regard to FIG. 3B may be executed (step 308). When the data is not in a free form, ASCII, or EDI format, the data may be unidentified and process 300 may be aborted (step 306).

When a data source interface is available, configuration information is received from the user (step 310). Such configuration information may include a selection of a data store access type, e.g., ODBC/JDBC, and driver information and associates them with a database name. Then, when invoked, the configuration information is used to access one or more of data store(s) 60 (step 312). Data schema details are obtained (step 314) from the data store and assembled (e.g., in an XML format) with headers (e.g., table name, field name, field descriptors (if available), field data type and values, relationships, and constraints, etc.) (step 316). The resulting assembly is then formatted and saved in the meta detect data store 130 (step 318).

Figure 3A:
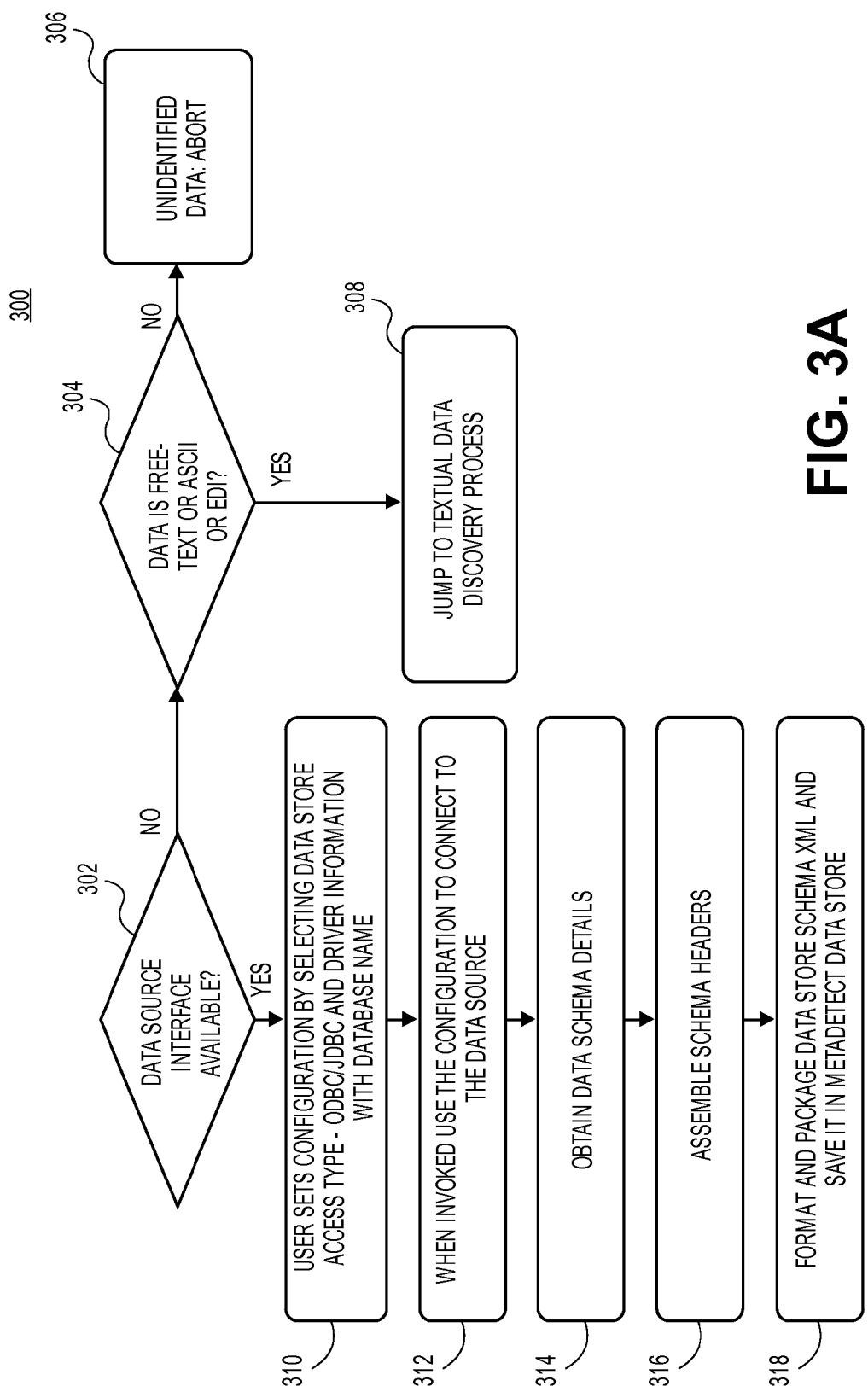
FIGS. 3A and 3B are flowcharts depicting an exemplary process for retrieving a data score schema, in accordance with an embodiment of the present invention.
Figure 3B:
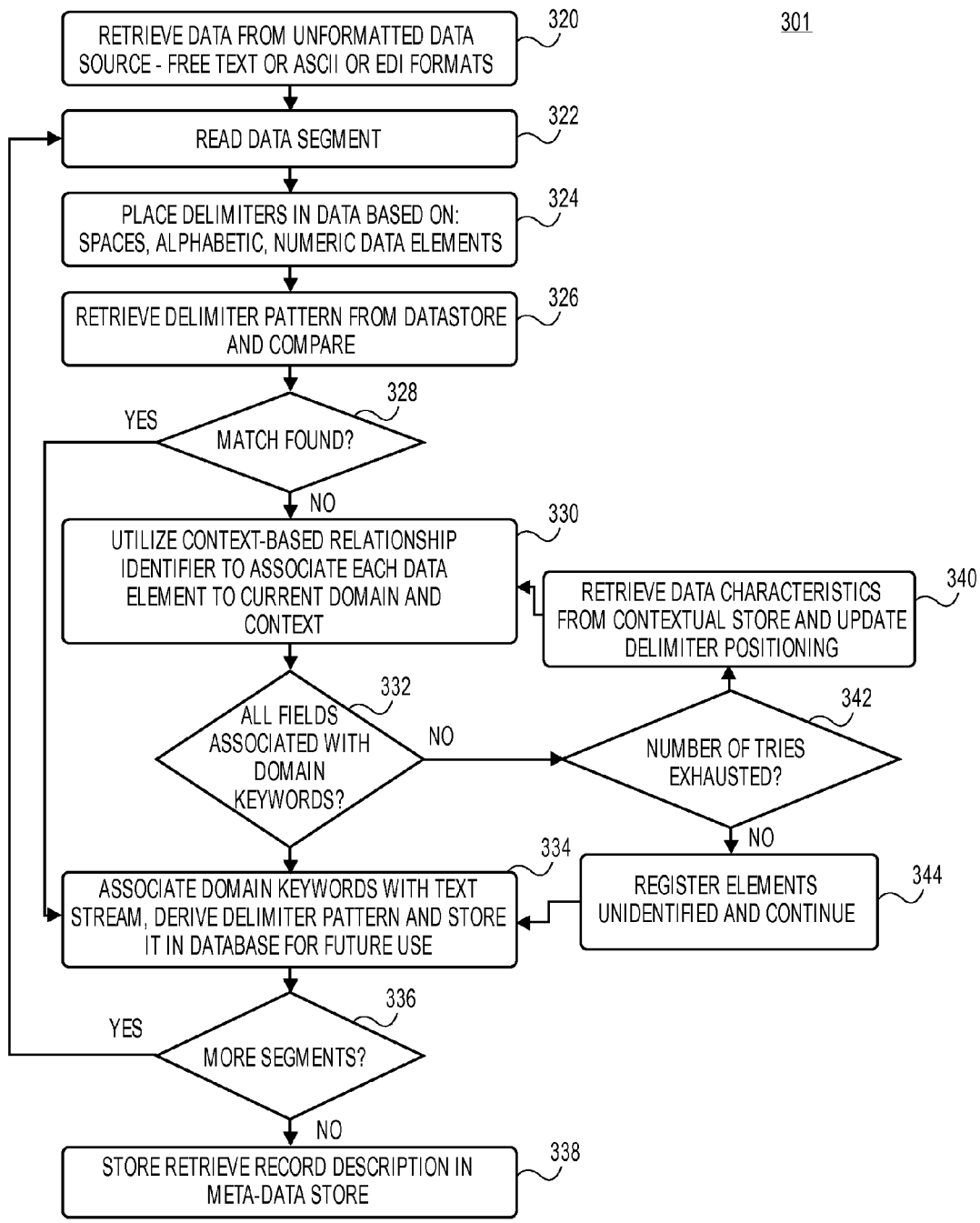

As mentioned in the process depicted in FIG. 3A, process 300 utilizes user configured interfaces for the data sources that have predefined or available interfaces. For unknown data sources, wherein the input is a stream of free-text or ASCII data in no specific format, a textual data discovery process 301 as shown in FIG. 3B may be executed.

Initially, in step 320, data in one or more segments is retrieved from an unformatted data source. The data may be in the form of, for example, free text, ASCII or EDI formats. The data segments will be read (step 322) and delimiters may be placed on the data based on, for example, predefined data types and delimiters like SPACES, NUMERIC, DATE, TIME or ALPHABETIC data characters occurring together (step 324). For example, when the data segments are in the form of:

1090209 INV Jan, 01, 2000 MR. JOHN DOE 3345 1ST ST SACRAMENTO Calif. 95832 234.50

It may be reformatted with delimiters in first parse as:

1090209, INV, Jan. 1, 2000, MR., JOHN, DOE, 3345, 1ST, ST, SACRAMENTO, Calif., 95832, 234.50

A delimiter pattern may be retrieved from, for example, meta detect data store 130 and compared with the delimiter pattern of the retrieved data (step 326) and when a match is found (step 328), domain keywords may be associated with the data segment(s) and a delimiter pattern for the received data segment(s) and the associated domain keywords may be derived and stored (step 334). For example, the above stream may be delimited as:

1090209, INV, Jan. 1, 2000, MR. JOHN DOE, 3345 1ST ST, SACRAMENTO, Calif, 95832, 234.50

When a match is not found (step 328), context-domain components of the context-based relationship identifier 120 may be used to associate the received data with a current business domain and context. When all fields of the received data are associated with domain keywords (step 332), step 334 may be performed. When all fields of the received data are not associated with domain keywords (step 332), it may be determined whether the number of tries to perform the matching is exhausted (step 342). When exhausted, data characteristics may be retrieved from the contextual store and the delimiter positioning may be updated (step 340) and step 330 may be repeated. When the number of tries is not exhausted, the unidentified data elements may be registered (step 344) and step 334 may be repeated.

Next, in step 336, it may be determined whether there are any more data segments of the received data remaining to be processed and, if so, steps 322-336 may be repeated until all data segments are processed. When no data segments remain to be processed, the retrieved record descriptions may be stored in meta detect data store 130 (step 338).

In some embodiments, a record of the results of process 301 may be saved in for future use or comparisons. As an example the above stream of data may be associated with the following meta-data record layout:

Serial Number, Record Type, Date Issued, Name Issued, Address 1, City, State Zip, Amount Charged And the corresponding pattern for this record may be saved as:

N7~3C~DT~C12~C11~C10~2C!N5~ND2

In above pattern N stands for numeric data, DT indicates date, C stands for character data, ~ is the element separator, ! indicates a space separator within an element and ND indicates decimal data.

The importance of storing the pattern along with the identified meta-data description of the data is that when the next segment is read, the assembly will first compare it with all the collected patterns and if it matches then it bypasses the discovery process and marks the record with already discovered meta-data description. This can be helpful when discovering data from a large free-text or ASCII stream. In some embodiments, process 301 may be configurable to allow a user to enter a maximum number of records to use to obtain meta-data descriptions and collect patterns. Once the assembly passes the maximum record type limit, it will simply read the data segment and compare it with existing pattern and classify it accordingly.

The assembly may then associate the meta-data with the segment data and also reformat the input data into XML format providing a schema-data layout, and an example of this is shown below:

```
<ASCII-DATA-DESC>
  <RECORD NUMBER="1">
    <SERIAL-NUMBER>1090209</SERIAL-NUMBER>
    <RECORD-TYPE>INV</RECORD-TYPE>
    <DATE-ISSUED>01/01/2000</DATE-ISSUED>
    <NAME>MR. JOHN DOE</NAME>
    <ADDRESS-1>3345, 1ST ST</ADDRESS-1>
    <CITY>SACRAMENTO</CITY>
    <STATE>CA</STATE>
    <ZIP>95832<ZIP>
    <AMOUNT-CHARGED>234.50</AMOUNT-CHARGED>
  </RECORD>
</ASCII-DATA-DESC>
```

Figure 4:
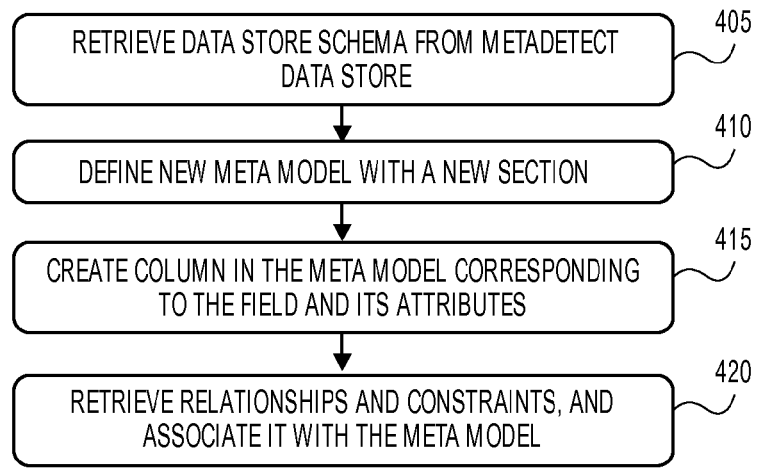
FIG. 4 is a flowchart depicting an exemplary process for creating a new base meta model, in accordance with an embodiment of the present invention.

The process of defining a base meta model for a discovered data store schema is performed by the auto-discovery meta model component 125 illustrated in FIG. 1. FIG. 4 illustrates a process 400 used by the auto-discovery meta model component 125 to create a new base meta model for a data store schema. At the outset, a data store schema is retrieved from the meta detect data store 130 (step 405). A new meta model with a new section is defined (step 410). For each field and its attributes included in the retrieved data store schema, a corresponding column is created in the new meta model (e.g., field name, data type, value, etc.) (step 415). Field descriptors are associated as definition attributes for the column in the meta model (step 415). Once all of the fields have been registered in this fashion, the relationships and constraints are retrieved from the data store schema and associated with the new meta model (step 420). When storing the new meta model, system 100 stores all of the mappings between the original data store schema table/fields and the meta model sections/columns. The auto-discovery meta model component 125 may also perform meta model discovery for relational meta models, as described below.

The discovery function can, in some instances, be performed manually via an appropriate user interface. In such instances, the user may manually create the meta model and map it to the data store schema in meta detect data store 130. Regardless of whether it is done manually, automatically or semi-automatically, once the base meta model has been created the user may review it and associate additional definition 215 changes or aliases 220 or even change the column names.

Figure 5:
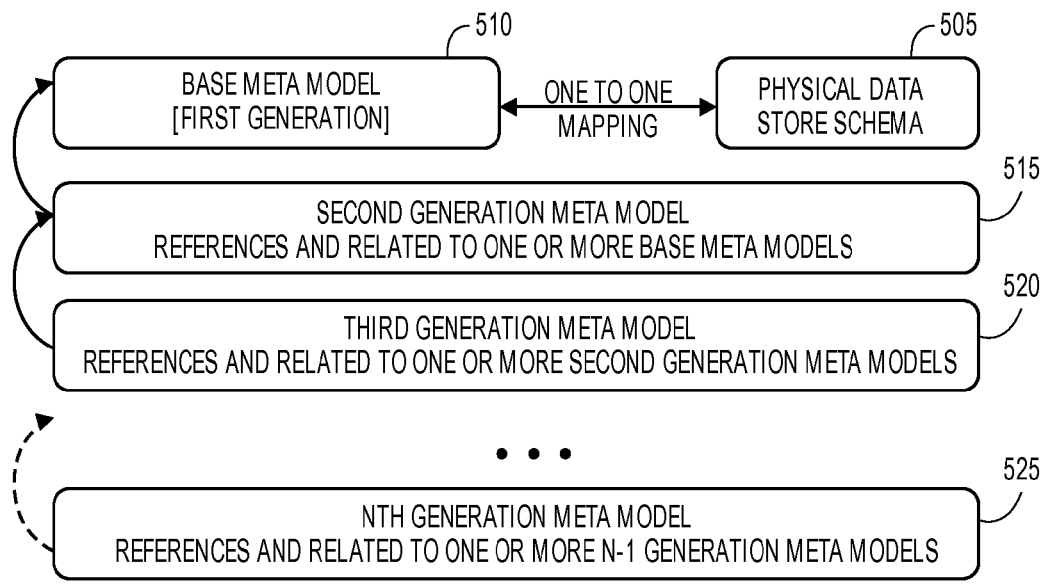
FIG. 5 is a block diagram illustrating an exemplary map of meta model generations and their inter-generational references, in accordance with an embodiment of the present invention.

As indicated above, each new generation of meta model, once created by auto-discovery or otherwise, will reference previous generations and may also reference meta models of the same generation. A meta model relationship manager component 140 manages the relationships between the generations of meta models as and when discovered by the auto-discovery meta model component 125. FIG. 5 illustrates an example of map 500 showing meta model generations and their inter-generational references.

As shown, the base meta model 510 has a one-to-one mapping with the original data store schema 505 and each succeeding generation of meta model leverages that mapping by including a relation to its immediately preceding generation (and in some cases multiple preceding generations), thereby establishing a chain back to the base model 510. Stated differently, a new generation meta model can be formed or its members derived by referencing more than one previous generation meta models. Since the discovery or formation of a next generation meta model by the auto-discovery meta model component 125 is expected to combine new information, succeeding generations of meta models may be regarded as representing acquired knowledge. That is, each successive generation of meta model is a derived meta model, inferred from previous generations of meta models, with relationship information managed and maintained by the meta model relationship manager 140. For example, map 500 illustrates the relationship between base meta model 510 and a second generation meta model 515 and the relationship between second generation meta model 515 and a third generation meta model 520 and the relationship between third generation meta model 520 and an nth generation meta model 525.

Figure 6:
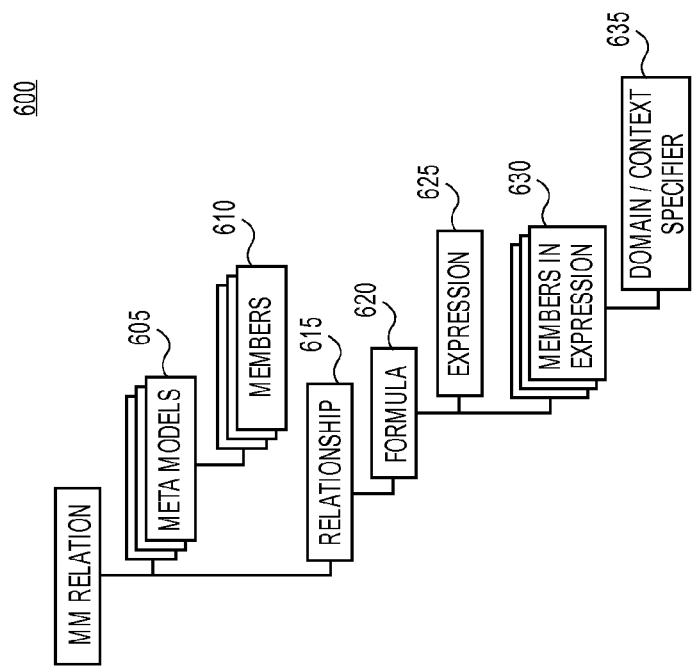
FIG. 6 is a block diagram illustrating an exemplary meta model relationship structure, in accordance with an embodiment of the present invention.

To facilitate the storage of these newly discovered relationships, some embodiments of the present invention use a meta model (MM) relation structure 600, an example of which is depicted in FIG. 6. As shown, a relationship between several meta models that are discovered during the auto-discovery process and/or generated by one or more processes described herein is saved as MM relation structure 600. MM relation structure 600 provides details of meta models 605 involved with one or more contributing members 610. Contributing members 610 may include meta models that participate in a particular relationship definition 615. The relationship 615 itself may be specified by a formula 620 or other construct, which specifies how the meta model 605 and its members 610 are related. An expression 625 describes the formula and can be, for example, a computational equation or a proportionality expression. Finally, for each member in the expression 630, the domain or context 635 by which it was found suitable for inclusion within MM relation structure 600 is also specified in the structure.

Figure 7:
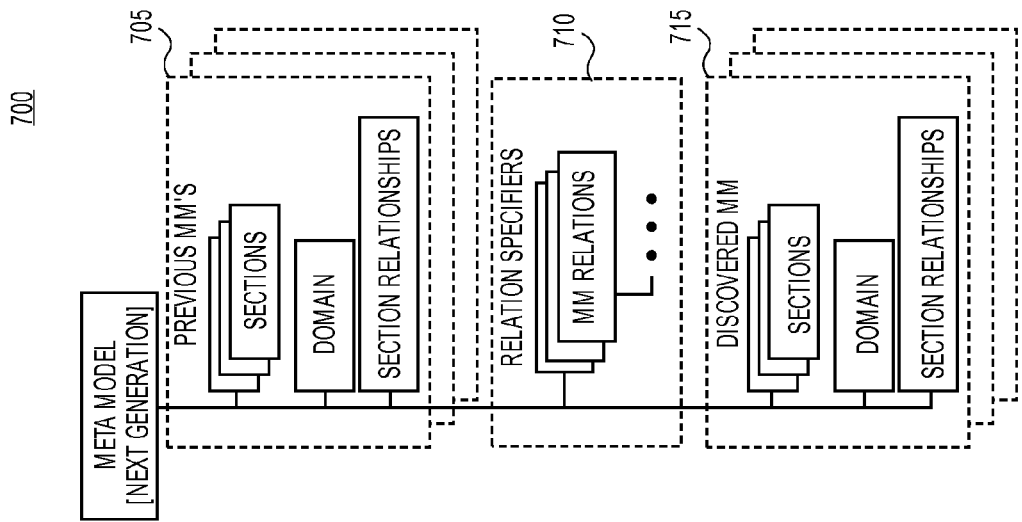
FIG. 7 is a block diagram illustrating an exemplary relationship structure, in accordance with an embodiment of the present invention.

Once the next generation meta model is derived by the auto-discovery meta model component 130, the derived meta model, along with its associated relationships (see FIG. 6), is stored and managed in the meta detect data store 130 by the meta model relationship manager 140. FIG. 7 shows the layout of an exemplary relation structure 700 for storing multiple generations of meta models.

As shown, relation structure 700 includes the next generation meta model description 705 and a relation specifier 710, which defines the related columns 715 within the next meta model and associations with prior generation meta models. Note that the relation specified within relation structure 700 can be direct, like 'derived from,' or complex, for example, using a computational equation or proportionality to describe the derivation. Relation structure 700 also facilitates describing discovered meta models, which include the same structure as standard meta models.

Figure 8:
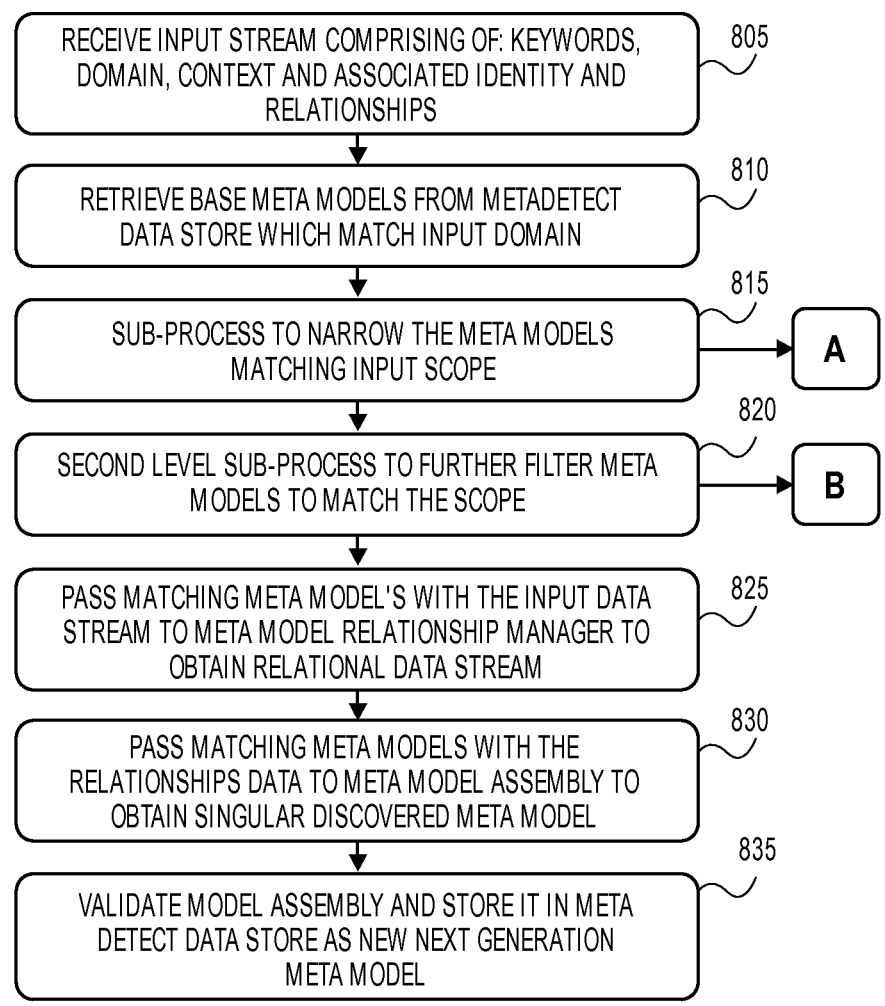
FIGS. 8-10 are flow charts depicting exemplary processes for achieving matches to queries and generating new meta models, in accordance with an embodiment of the present invention.
Figure 9:
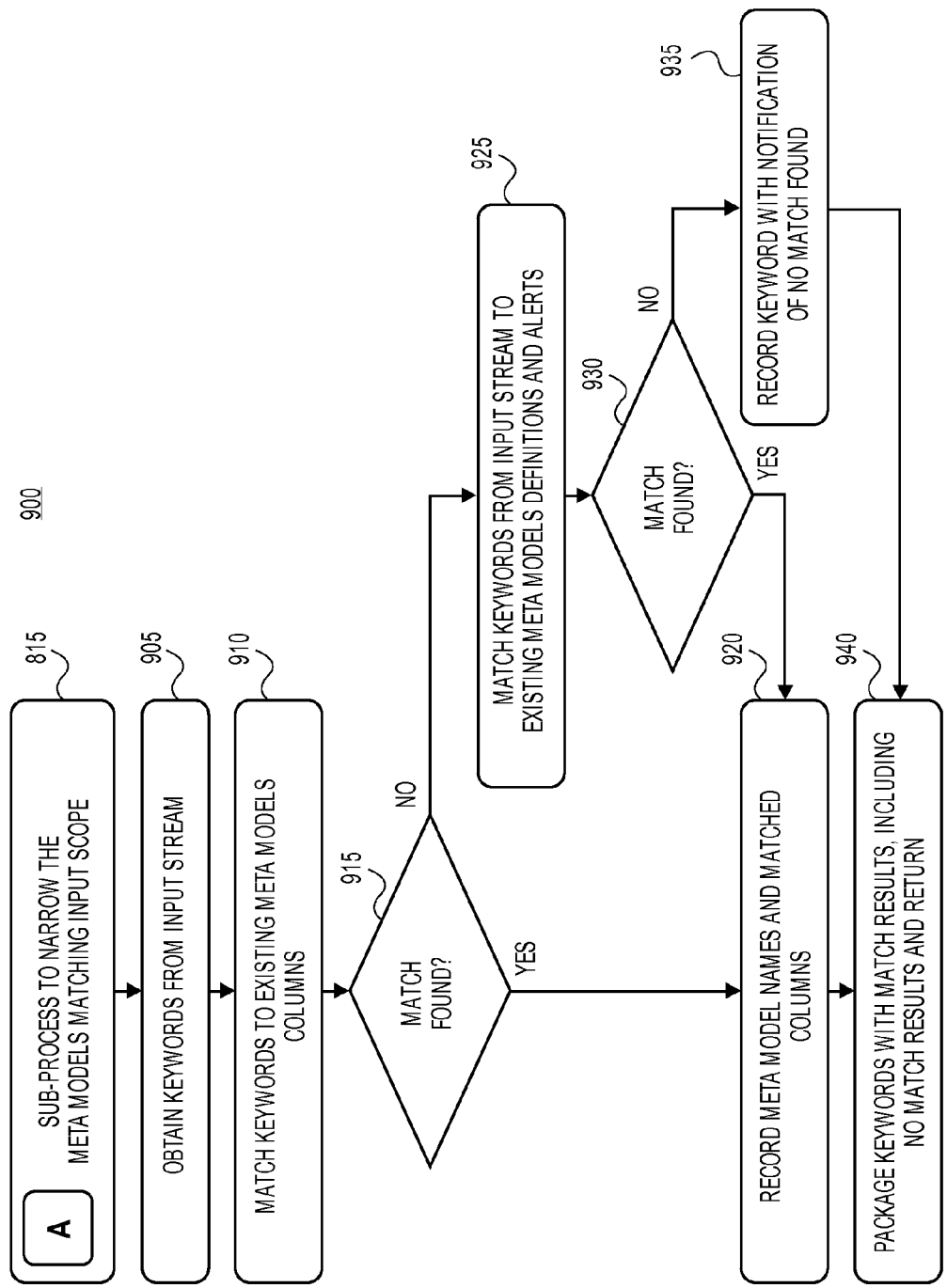
Figure 10:
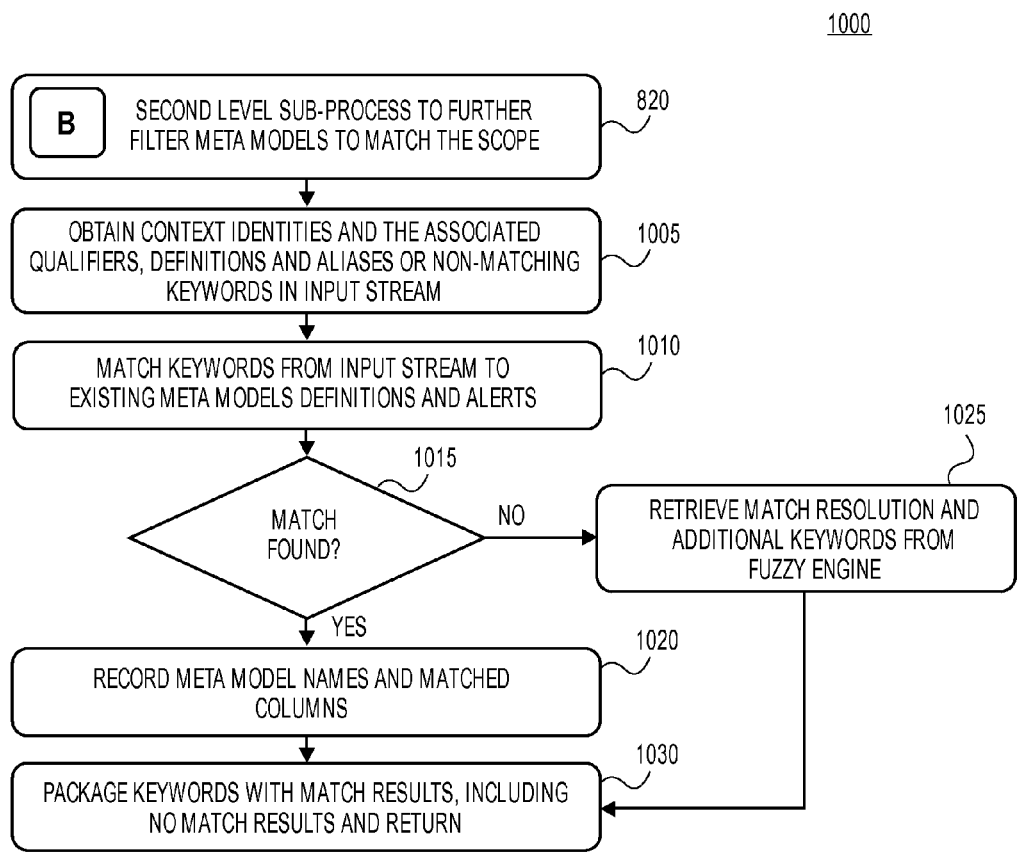

The auto-discovery meta model component uses specific process 800 and sub-processes 900 and 1000 as shown in FIGS. 8, 9 and 10, respectively, to achieve matches to queries and generate new meta models. It utilizes the matching of keywords and identities resolved by context-based identity relationship generator component 120 of system 100.

Beginning in FIG. 8, an input stream that includes keywords, domain and context information, and associated identity and relationships is received (e.g., in the form of information retrieved from a remote data source) (step 805). In response, one or more base meta models are retrieved from meta detect data store 130 (step 810). In most cases, the retrieved base meta models will match a domain specified (or implied) by the input stream. A first sub-process A (see FIG. 9) is then called to selectively filter, or reduce, the number of meta models matching the input stream (step 815) so that only meta models that match the input stream are further processed (step 820).

As shown in FIG. 9, sub-process 900 selectively filters, or reduces the number of meta model matching input streams. The process begins by obtaining keywords from the input stream (step 905). The keywords are compared to the retrieved base meta model's columns (step 910). When a match is found (step 915), the name of the matching base meta model and the columns matched are recorded (step 920), otherwise, keywords from the input stream are compared to definitions and aliases included within the respective base models (step 925) and, as before, if a match is found (step 930), names of the matching meta models and the columns matched are recorded (step 920). If no matches are found, the keyword is simply recorded without a match and with a notification of no match being found (step 935). Once all of the keywords have been evaluated, the keywords and match results, including the no match results, may be packaged (step 940) and used to perform a second level sub-process to further filter the match results to more closely match the scope of the input stream (step 820).

Returning to FIG. 8, upon return from sub-process 900, the auto-discovery meta model component 125 calls sub-process B, illustrated in FIG. 10, to further filter the matching base meta models to match the scope of the input stream (step 820). As part of this sub-process 1000, column definitions and aliases are obtained from the context-based domain taxonomy generator 110 (step 1005). The column definitions and aliases are then compared to the non-matching keywords (step 1010) and, when a match is found (step 1015), the match is recorded (step 1020). When a match is not found (step 1015), additional applicable associations to the non-matching keywords that could not matched by direct comparison may be retrieved from a fuzzy engine 135 (step 1025). Process 1000 may repeat until all non-matching keywords have been tested and the keywords, match results, and meta model referenced are then packaged and returned to the main process illustrated in FIG. 8 (step 1030).

Upon return from the second level sub-process 1000, the auto-discovery meta model component 125 passes matching meta models with the input data stream to the meta model relationship manager 140 to obtain a relational data stream (step 825). The matching meta models and the relationship data are passed to the meta model assembly component 145 to obtain singular discovered meta models (step 830). Finally, the meta model assembly is validated and stored in the meta detect data store 130 as a new, next generation meta model (step 835).

Figure 11:
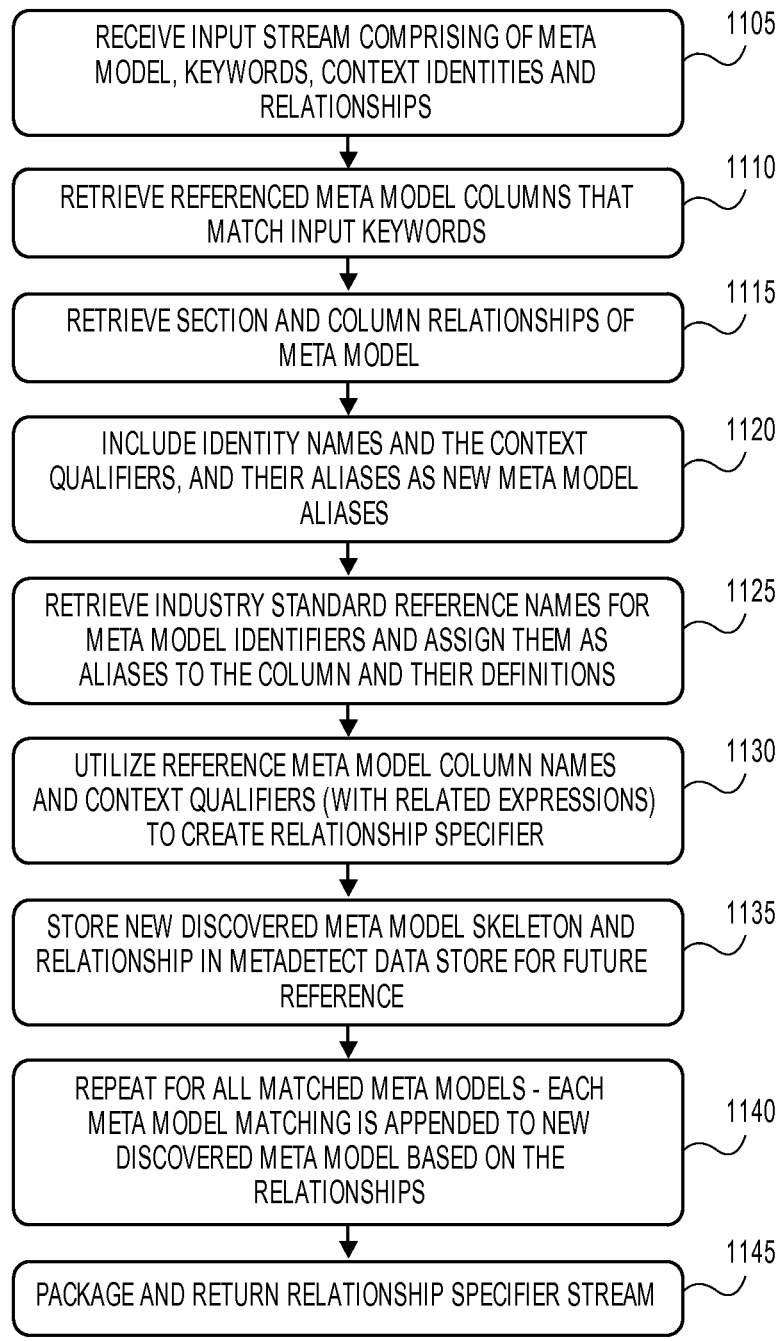
FIG. 11 is a flowchart depicting an exemplary process for packaging a relationship specifier stream, in accordance with an embodiment of the present invention.

Matching meta models, as determined via process(es) 800, 900, and/or 1000 may be packaged as an MM relationship schema (shown in FIG. 6) by the meta model relationship manager component 140 and the MM relationship schema may be stored in the meta detect data store 130. FIG. 11 illustrates an example of this process 1100.

First, in step 1105, an input stream including keywords, context identifiers, relationships, and matching meta models may be received (step 1105) and meta model columns that match input keywords may be retrieved (step 1110). For each matching reference meta model, the section and column relationships of the meta model are retrieved (step 1115) and identity names and context qualifiers (and their aliases) of the matching reference meta model are included in the MM relationship schema as new meta model aliases (step 1120). Next, industry-standard or other common reference names for meta model identifiers are retrieved and assigned as aliases to the columns and their definitions (step 1125) and the referenced meta model column names and context qualifiers (with related expressions) are used to create relationship specifiers (step 1130). The new discovered meta model is stored, along with relationships, in the meta detect data store 130 (step 1135). As process 1100 is performed for each matched meta model, each matched meta model is appended to a newly discovered meta model based on the matching relationships (step 1140). Within this process, additional column aliases and definitions with associated context/expression information are obtained from the fuzzy engine 135 for a preconfigured score limit. When process 1100 is complete, the MM relationship schema is complete and a stream of information conveying the MM relationship schema is packaged and returned (step 1145).

As indicated above, the meta model assembly component 145 takes the input relationship stream and the meta model constructed from the matching columns, validates it and repackages it to be saved into the meta detect data store 130 for further use. Note that the meta model assembly component 145 registers each newly discovered meta model under the specific domain-context section of the data store and also maintains the bookkeeping of model creation as related to input query and resolved keywords. This information is used by the system to further check if a similar discovery of a new meta model for the same scenario was previously performed, and if so, is available to be returned as a previously constructed meta model instead of discovering a new one.

Figure 12:
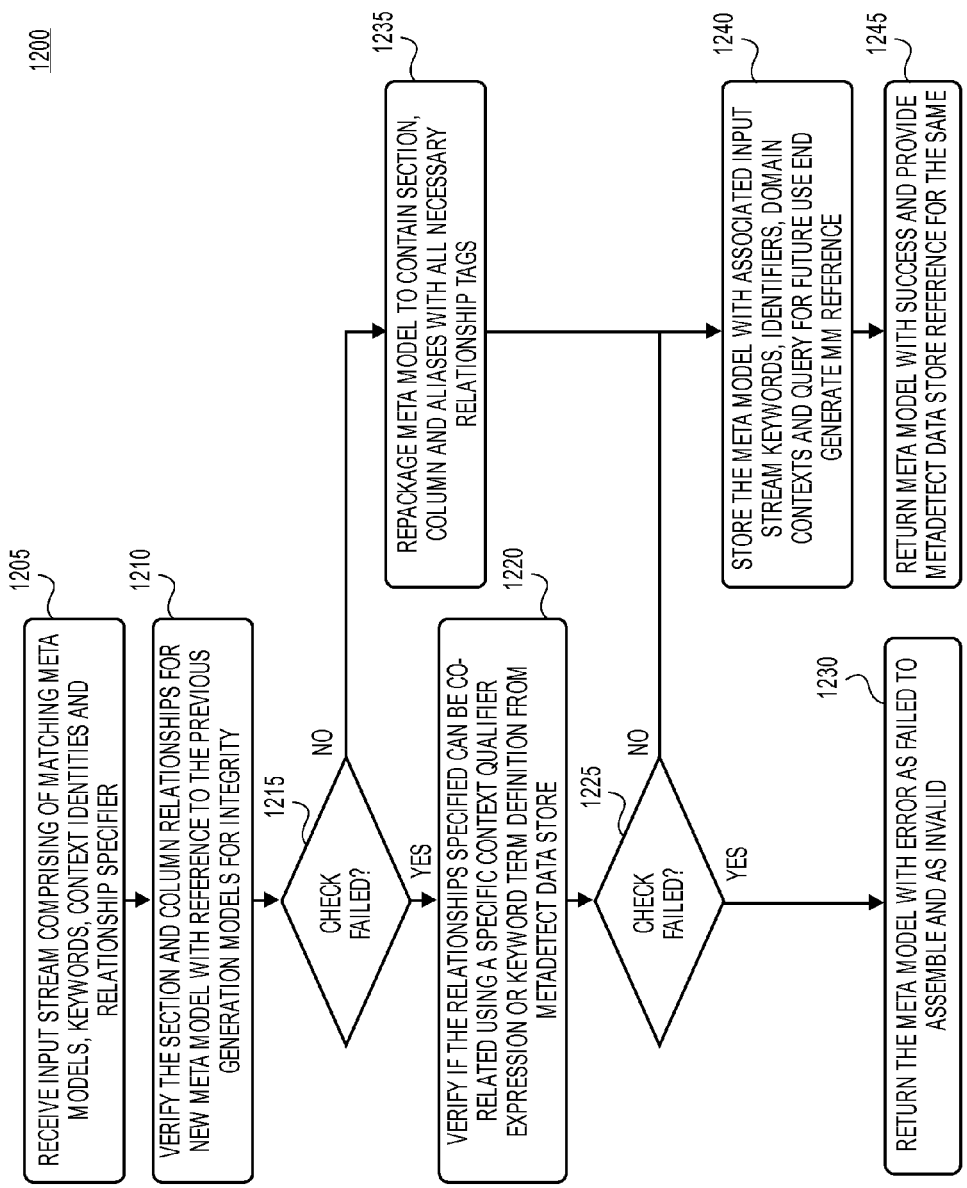
FIG. 12 is a flowchart depicting an exemplary process for performing validation storage of a newly discovered meta model, in accordance with an embodiment of the present invention.

FIG. 12 shows a process 1200 executed by meta model assembly component 145 to perform validation and storage of a newly discovered meta model. An input stream that includes matching meta models, keywords, context identifiers and relationship specifiers is received (step 1205). The section and column relationships for the new meta model are verified with reference to any related previous generation meta models for integrity (step 1210). If the relationships cannot be so verified (step 1215), the meta model assembly component verifies whether the relationships specified can be correlated using a specific context qualifier expression or keyword term definition from the meta detect data store (step 1220). If not (step 1225), the meta model is returned with an error indicating it failed to assemble and is invalid (step 1230). If the section and column relationships for the new meta model are verified with reference to the previous generation models for integrity (step 1215), then the meta model is repackaged to contain section, column and aliases with all necessary relationship tags (step 1235). Thereafter, or if the section and column relationships for the new meta model cannot be verified with reference to the previous generation models but the relationships specified can be correlated using a specific context qualifier expression or keyword term definition from the meta detect data store 130, the meta model is stored with associated input stream keywords, identifiers, domain-contexts and queries for future use and the MM Reference structure is generated (step 1240). Upon completion, the meta model is returned along with an indication of successful assembly to the meta detect data store (step 1245).

As shown in FIG. 1, inputs to system 100 are provided through an input interface and query resolution module component 105. Though module 105 may provide a simple query interface, the input stream can also be in, for example, an XML format coming from an external system. In one embodiment, input interface and query resolution module component 105 is a simple text interface that allows a user to enter the query in the form of a question. Alternatively, graphical and/or speech-to-text interfaces may be used. The input interface and query resolution module component 105 decodes the content of user query and packages it in XML format for the next components in system 100 to process. Processes 1300, 1400, and 1500 as shown in FIGS. 13, 14, and 15, respectively, provide further details of the operation of the input interface and query resolution module component 105.

Figure 13:
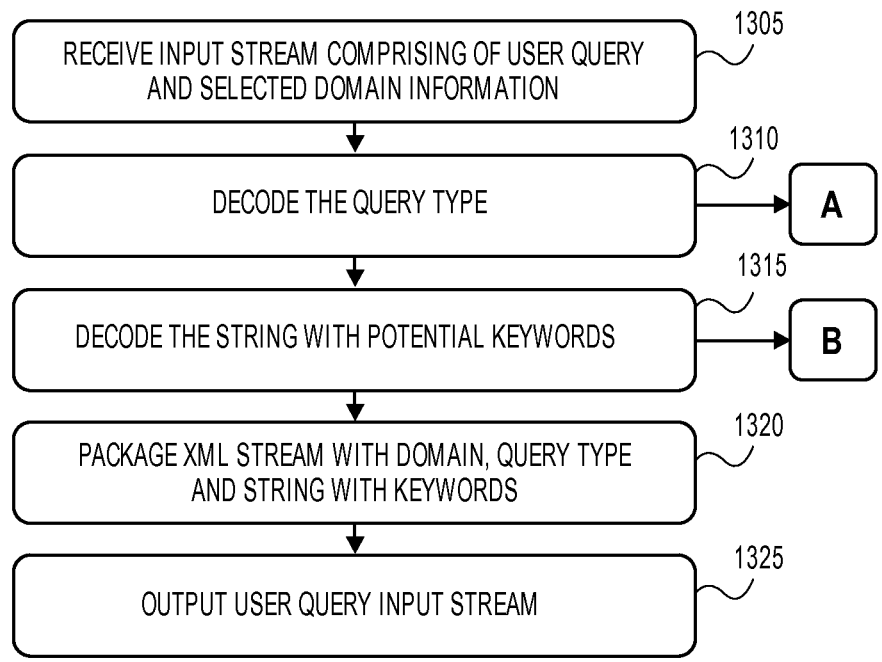
FIGS. 13-15 are flow charts depicting exemplary processes for resolving a query, in accordance with an embodiment of the present invention.
Figure 14:
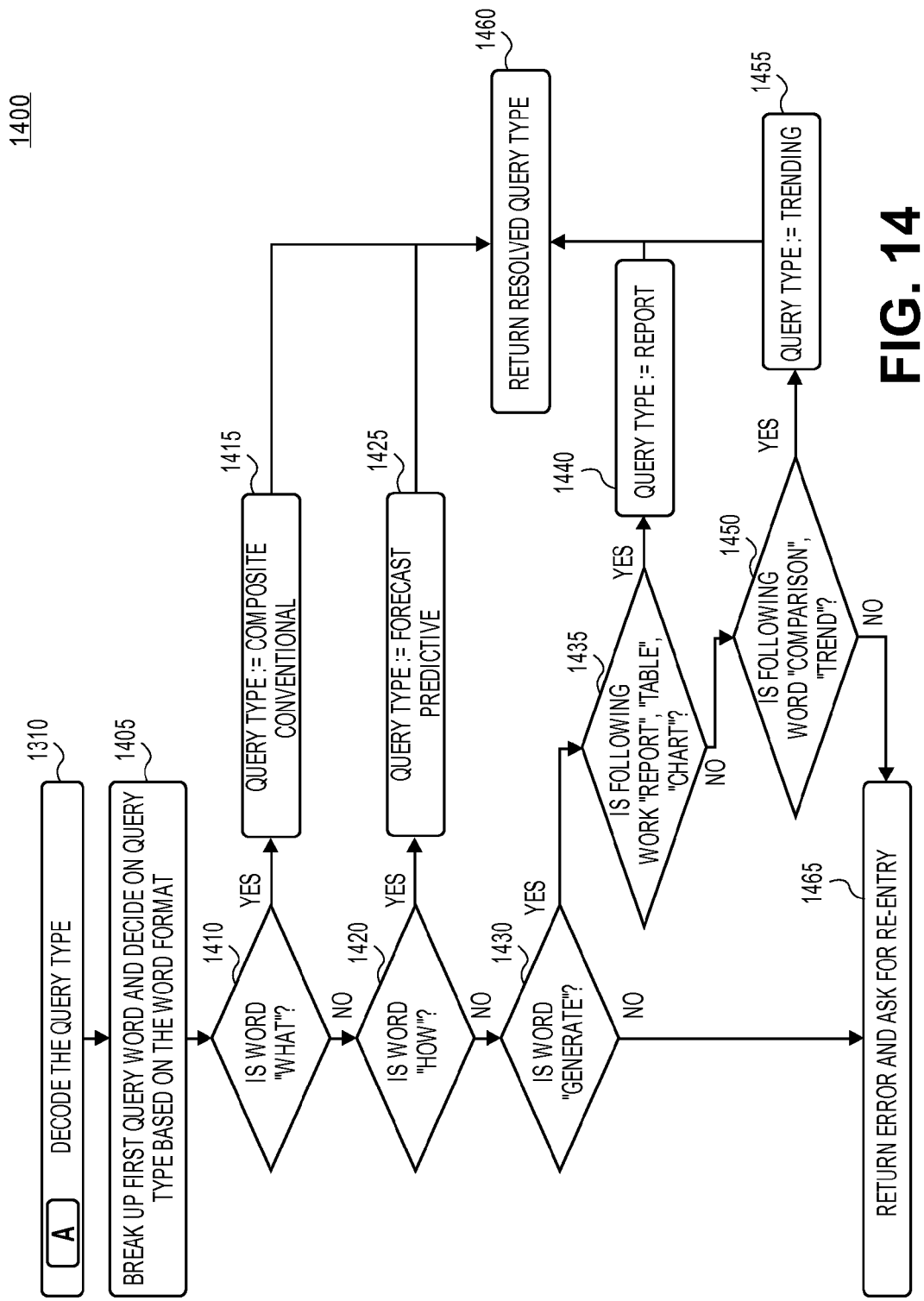

Beginning at FIG. 13, an input stream that includes the user query and domain information is received (step 1305) and decoded (step 1310). An exemplary decoding process 1400 is illustrated in FIG. 14. During decoding process 1400, the first word of the query is examined to determine the query type (step 1405). If the query begins with the word "what," (step 1410) the type is determined as a composite conventional query (step 1415) and the resolved query type is returned (step 1460). If the first word is "how," (step 1420) the type is determined as forecast predictive (step 1425) and the resolved query type is returned (step 1460). If the first word is "generate," (step 1430) the next word in the query string is examined. If the next word is "report," "table," or "chart," (step 1435) the query is classified as a report type (step 1440) and the resolved query type is returned (step 1460). However, if the word following "generate" is "comparison or trend," (step 1450) the query type is determined to be trending (step 1455), and the resolved query type is returned (step 1460). If no query type can be determined at this stage, the process returns an error and seeks re-entry of the query (step 1465). Note, in the above-described process, the use of terms "first word" and "next word" or similar are not intended to be restrictive. The present system can parse syntaxes of the form:

<<Query Type>><<descriptors or adjectives>><<keywords>> but can also parse more complex queries that have intervening words, phrases, etc., and so is not limited to the syntax shown immediately above.

Figure 15:
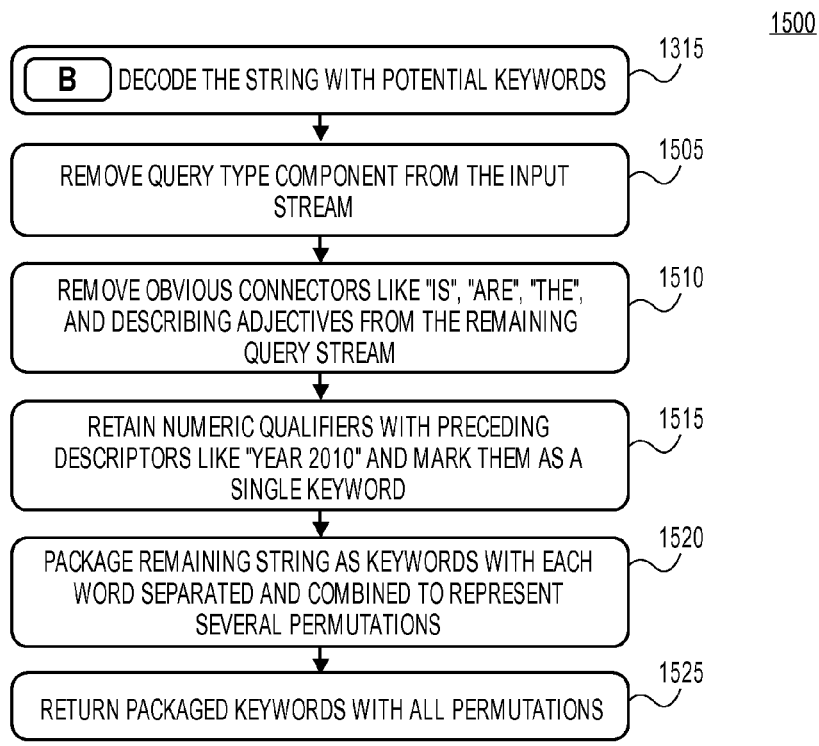

Assuming a query type is returned, the string is decoded with the potential keywords according to exemplary process 1500 as shown in FIG. 15. Process 1500 begins by removing the query type component (step 1505) and obvious connectors, such as "is," "are," "the," etc., as well as descriptive adjectives from the input stream/query (step 1510). Numeric qualifiers are retained if they have associated (e.g., immediately preceding or following) descriptors such as "year," "version," etc., and the number string and its descriptor(s) are marked as a single keyword (step 1515). The remaining words in the stream are packaged as keywords, both individually and in combinations with one another to represent the permutations of the keywords (step 1520), and this package is returned to the process shown in FIG. 13 (step 1525). In some cases, the query type and keywords may be packaged (e.g., in an XML stream) with domain information and provided as an output.

In addition to queries having the above-noted syntax, embodiments of the present invention require the user to select or enter a domain to which the query pertains. The domain may be a specific industry, such as Healthcare Industry, Bio-medical, Hospitals & Clinics, Insurance Billing, Investments, Financial, Banking, etc. or a more particular market segment within a broader industry. It is worth mentioning that the input module can be replaced or supplemented by any other natural language interpretation engine to facilitate a more elaborate decoding of a received query.

Figure 16:
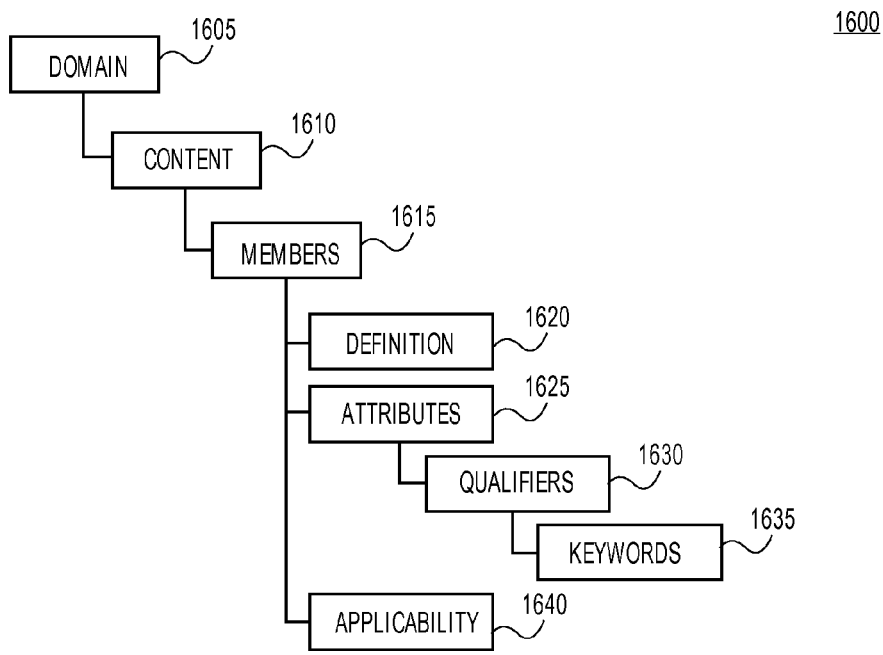
FIG. 16 is a block diagram illustrating an exemplary domain context section, in accordance with an embodiment of the present invention.

The packaged streams of domain, query type, and possible keywords are passed to the context-based domain taxonomy generator 110 and industry-based identity discovery components 115. Both the components use a predefined area in the meta detect data store 130 to obtain a query resolution hierarchy. The meta detect data store 130 may include a domain context store designed to provide association between the keywords and terms, for a specific domain. The structure of an exemplary domain context section 1600 of the meta detect data store 130 is shown in FIG. 16, wherein for each domain 1605, one or more contexts 1610 are defined. Each context 1610 has one or more members 1615. Each member 1615 has an associated definition 1620, with various attributes 1625, and an applicability 1640. The attributes 1625 of the member definition 1620 may be refined by one or more qualifiers 1630, which include possible matches for keywords 1635.

Figure 17:
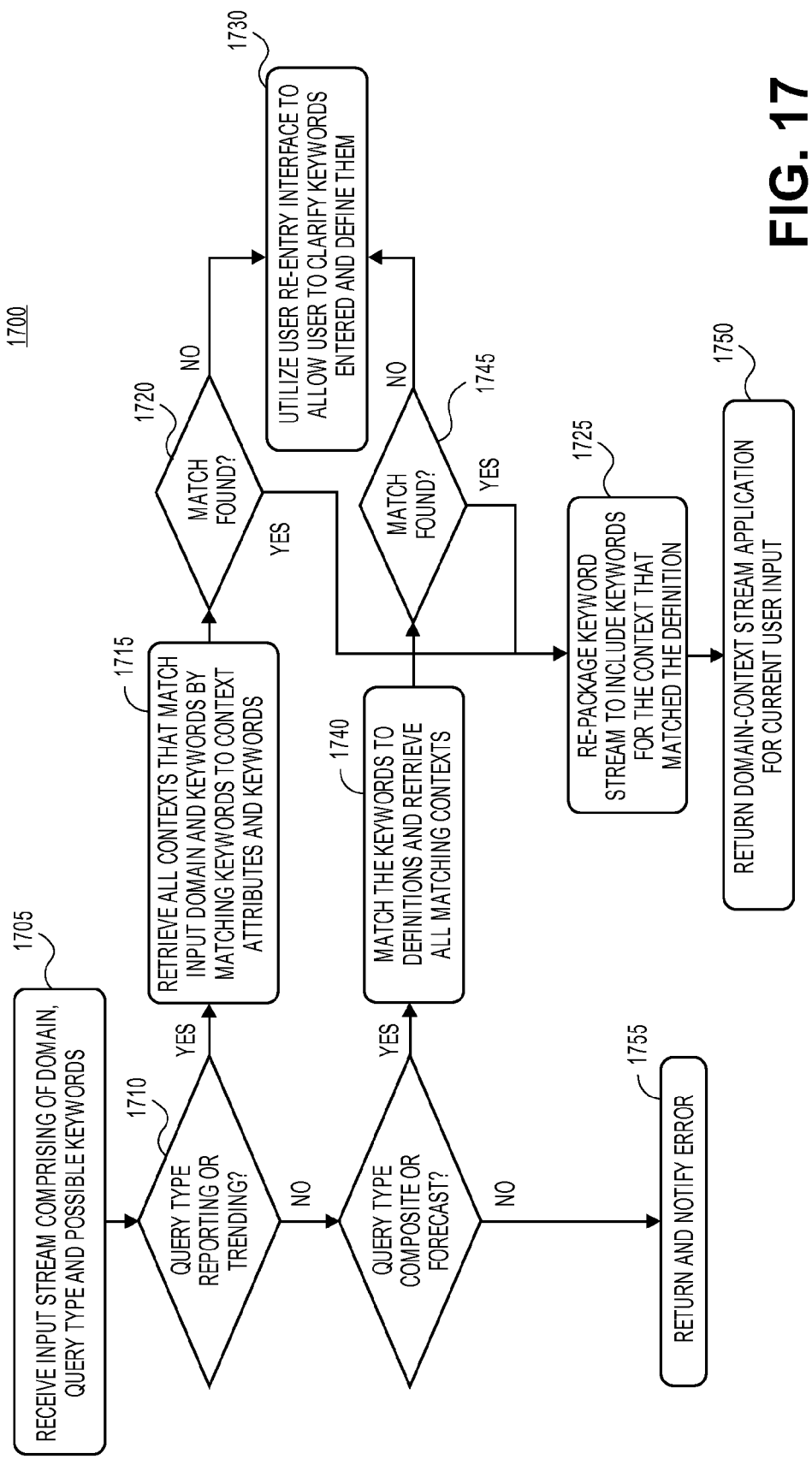
FIG. 17 flowchart depicting an exemplary process for deriving a definitive context for an input user query stream, in accordance with an embodiment of the present invention.

Context-based domain taxonomy generator component 110 utilizes information stored in and organized by the domain context section 1600 of the meta detect data store 130 to derive a definitive context for an input user query stream. For example, the information stored in domain 1605 and keyword 1635 may be used to query sections of the domain-context section of the meta detect data store 130 to derive the applicable contexts for the current user input. Note that the query type qualifier is also used by this component to further narrow down applicable contexts, since the query type specifies whether the user request is computational, reporting type or trending type. FIG. 17 depicts an example of a process 1700 implemented by the context-based domain taxonomy generator component 110 to derive a definitive context for an input user query stream.

Process 1700 begins when an input stream comprising domain, query type, and possible keywords are received by the context-based domain taxonomy generator component 110 (step 1705). As shown, if the input has been determined to be a reporting or trending type of query (step 1710), all contexts that match the input domain and keywords are retrieved by matching keywords to context attributes and keywords (step 1715). If a match is found (step 1720), the keyword stream is repackaged to include keywords for the context that match the definition (step 1725). If a match is not found (step 1720), the user is prompted to clarify the input query and/or keywords (step 1730).

If the query was determined to be a composite or forecast type (step 1735), the keywords are matched to definitions for the keywords and all matching contexts are retrieved (step 1740). When a match is found (step 1745), the keyword stream is repackaged to include keywords for contexts that match the definition (step 1725). If a match is not found (step 1745), the user is prompted to clarify the input keywords (step 1730). Then a domain-context stream applicable to the current user input is returned to system 100 (step 1750).

In some embodiments, system 100 may use the clarification provided by the user in response to the request of step 1730 to build its own knowledge base of keywords and/or user-specific terms and, hence, provide a "learning" mechanism for the system to mature when as it is used.

Figure 18:
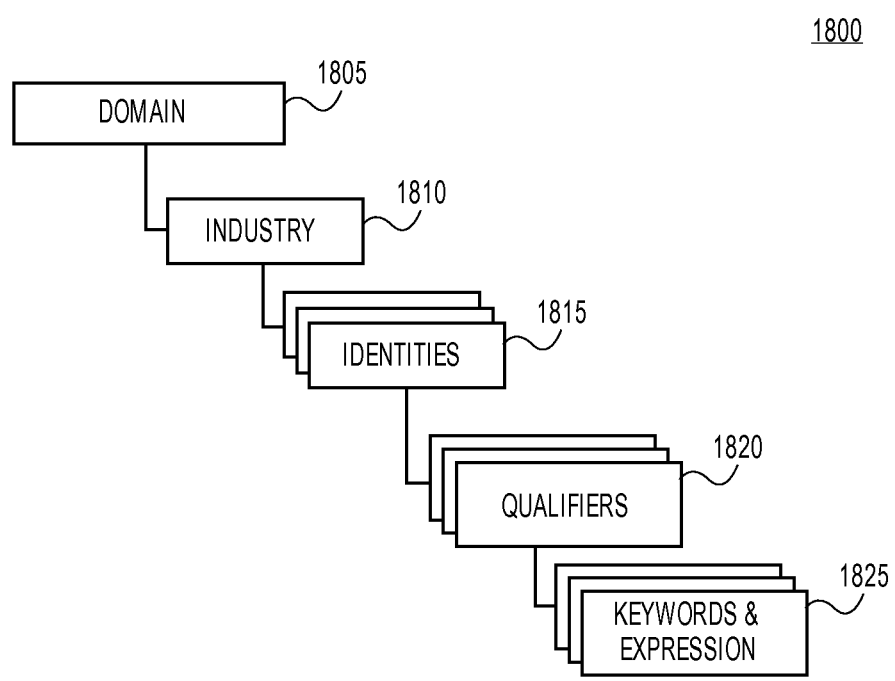
FIG. 18 is a block diagram illustrating an exemplary industry-based identity structure, in accordance with an embodiment of the present invention.

FIG. 18 illustrates an example of an industry-based identity structure 1800 stored within a data store, which is pre-populated with industry-specific identifier information. The information stored in industry-based identity structure 1800 may be used to, for example, obtain possible alternate keywords and expressions that might describe keywords included in a query or input stream. Each domain 1805, and industry 1810 within that domain 1805, may be associated with an identity 1815 based on, for example, the domain 1805 and may describe associations between keywords. Each identity 1815 may be associated with a set of industry-specific qualifiers 1820, each with multiple keywords and expressions 1825.

Figure 19:
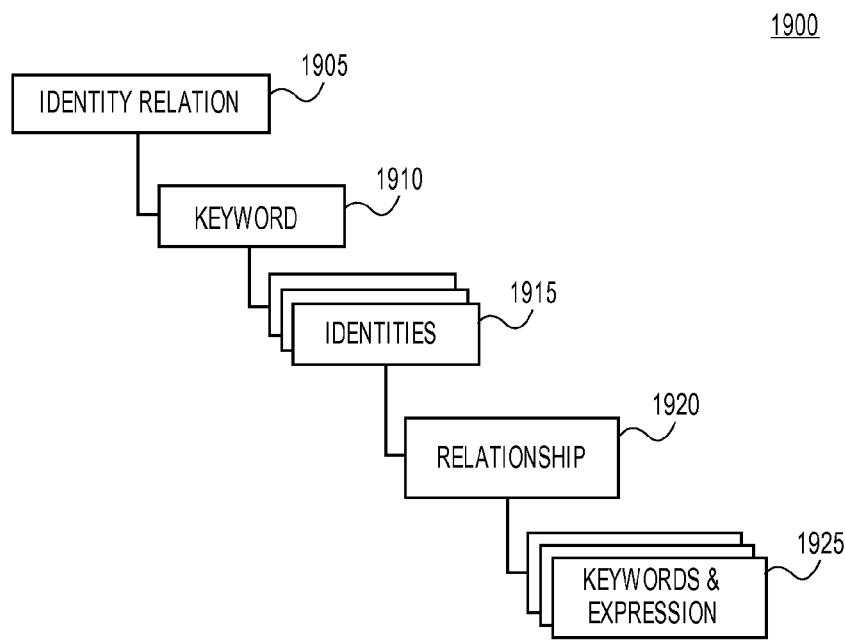
FIG. 19 is a block diagram illustrating an exemplary identity relation structure, in accordance with an embodiment of the present invention.

Further, the identities 1810 are related to each other and the scope of the relation can be direct or indirect (as in loosely coupled). FIG. 19 shows an example of a structure used for storing an identity relation 1905. In the identity relation structure 1905, each domain 1910 may have any of several identities 1915, each having a defined relationship 1920 and associated keywords and expressions 1925. Separate Identities 1915 and the relationships 1920 may be used to derive various keywords, which can be then associated with suitable contexts. It is important to mention that the identities 1915 and their relationships 1920 play an important role when deriving forecast type of query data. For example, two identities 1915 (e.g., stock prices and natural disasters) may not be directly related, but can be related by using a qualifier, such as:

Stock Prices are INVERSELY PROPORTIONAL to Natural Disasters

The identifier relationships can be further elaborated by additional relationship specifiers, such as:

Stock Prices are DIRECTLY PROPORTIONAL to Stock Indexes in Developed Countries

Either or both of the above relations can be skewed and/or considered together to perform inferencing, or when handling forecast type queries. Identity relationships 1900 thus provide a useful insight into the rules governing meta data behavior.

Figure 20:
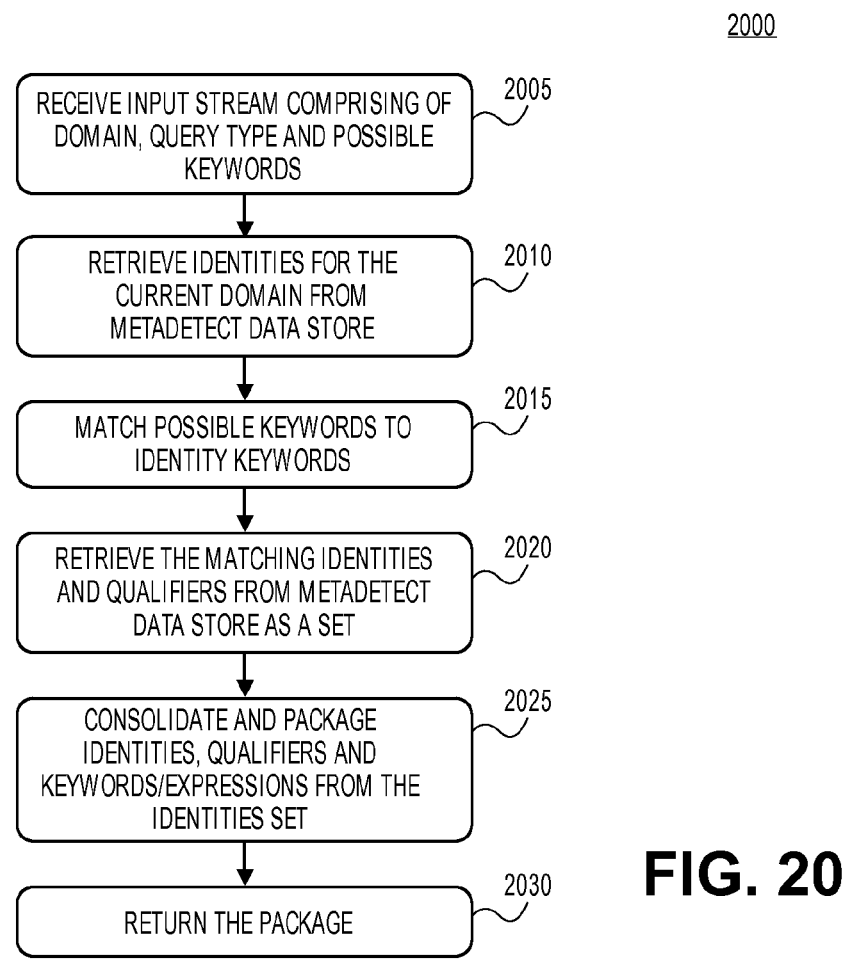
FIG. 20 is a flowchart depicting an exemplary process for matching keywords from a query to identity keywords associated with a domain, in accordance with an embodiment of the present invention.

FIG. 20 illustrates an example of a process 2000 conducted by the industry-based identity discovery component 115 to match keywords from a query to identity keywords associated with a domain. In step 2005, an input stream that includes the domain, query type and possible keywords may be received. In step 2010, identifiers for the received domain are retrieved from the meta detect data store 130 and the received possible keywords are matched to keywords associated with the identities (step 2015). In step 2020, the identities with matching keywords and associated qualifiers are retrieved from the meta detect data store as a set. The identities, qualifiers, and keywords from the set are then consolidated and packaged to be provided to the context-based identity relationship generator component 120 (step 2025).

Figure 21:
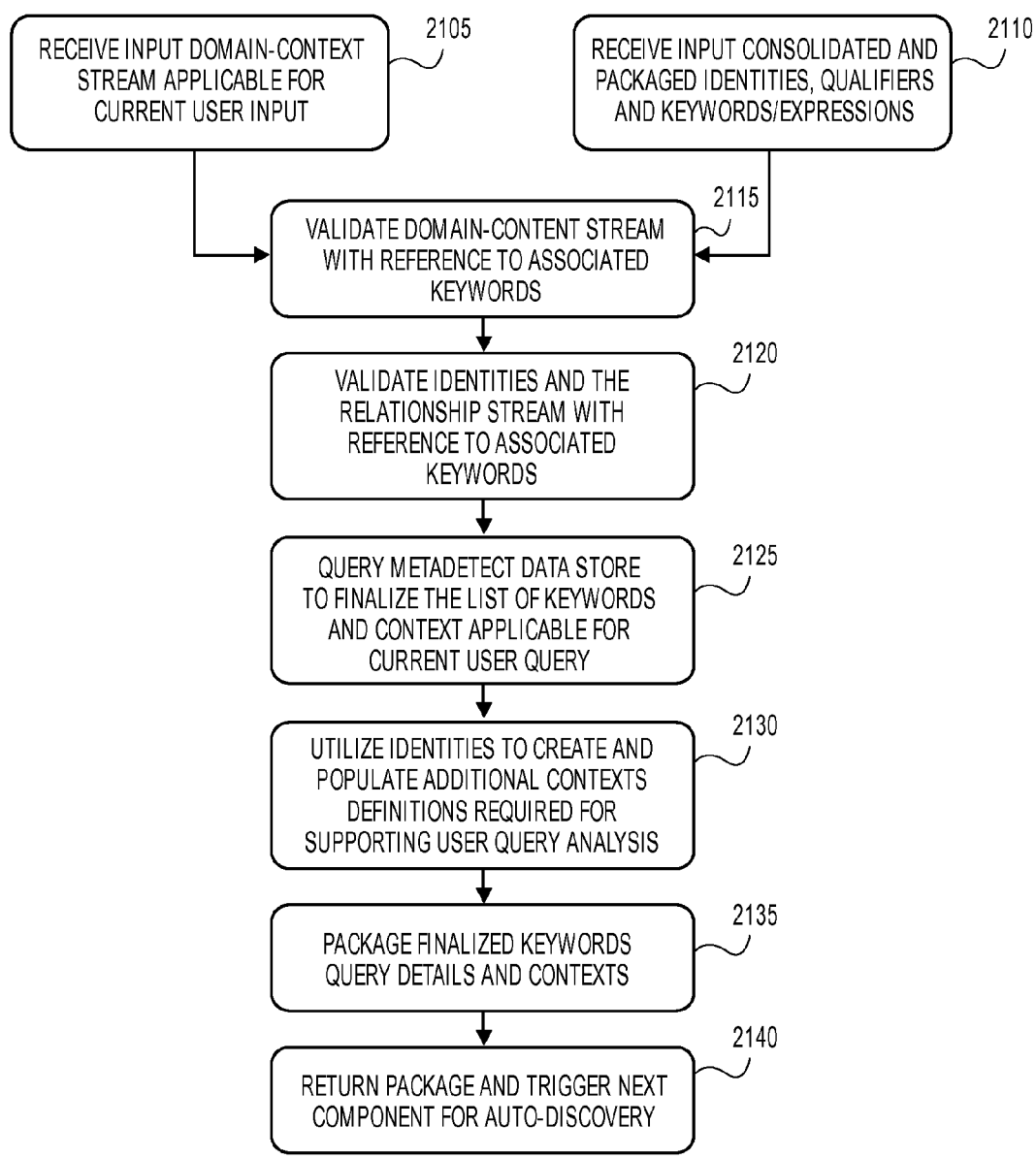
FIG. 21 is a flowchart depicting an exemplary process for retrieving relevant identity relationships, in accordance with an embodiment of the present invention.

As illustrated in FIG. 21, the context-based identity relationship generator component 120 takes the identities, qualifiers, and keywords of process 2000, and consolidates them together to retrieve relevant identity relationships in process 2100. This is done by taking the received input domain-context stream for the current user input (step 2105) and the consolidated identities, qualifiers, and keywords/expressions (step 2110) and validating the domain context-stream with reference to the associated keywords (step 2115). Next, the identities and relationships are validated with reference to the associated keywords (step 2120). The meta detect data store 130 is queried to finalize the list of keywords and context applicable to the current user query (step 2125), and the identities are used to create and populate additional context definitions required for supporting the user query analysis (step 2130). The finalized keywords are packaged along with the query details and contexts (step 2135) and the package is returned (step 2140). Thus, the context-based identity relationship generator component 120 generates an output by packaging the keywords, identities, and associated context with all relationships and triggers the auto-discovery 125 meta model component.

One of the key tasks performed by the context-based identity relationship generator component 120 is the use of identities to populate relevant contexts that will be used by further components to discover a meta model matching an input stream and/or query. For any query or keyword for which the previous component could not find a match, it passes that query/keyword to the fuzzy engine 135 for further resolution. The fuzzy engine 135 utilizes associations form the data store to find any applicable associations to the keywords that could not be matched by direct comparison. Alternatively, or in addition, the fuzzy engine 135 may also utilize dictionary and/or encyclopedia sections of the meta detect data store 130 or from any remote source accessible to system 100 to find synonyms matching the query/keyword(s) in question.

Figure 22:
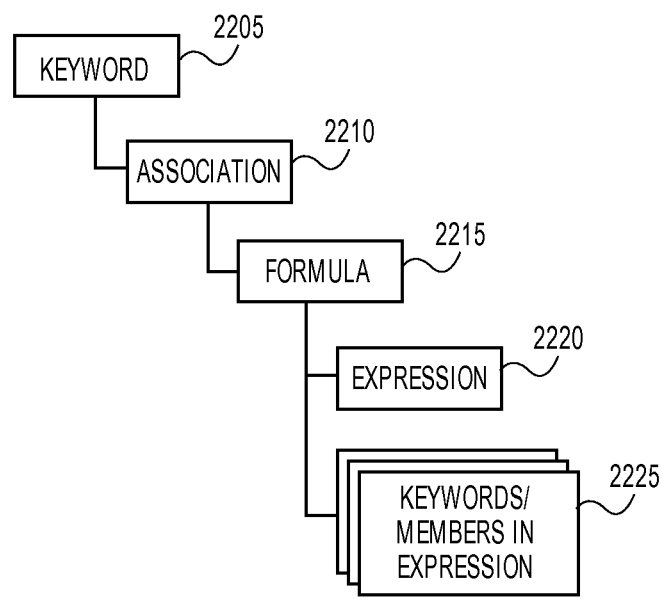
FIG. 22 is a block diagram depicting an exemplary data store structure, in accordance with an embodiment of the present invention.

An example of an associations data store structure 2200 is shown in FIG. 22. For each unmatched query and/or keyword 2205, one or more direct or indirect associations 2210 may exist. The associations 2210 may be defined by a formula 2215, which may be defined as an expression 2220 and/or represented as keywords/members in the expression 2225. Complex or composite unmatched queries and/or keywords 2205 can be represented as expressions 2225. As an example, the keyword "Labor Cost" may be described by an expression such as:

Hourly Wages*Hours Worked

Figure 23:
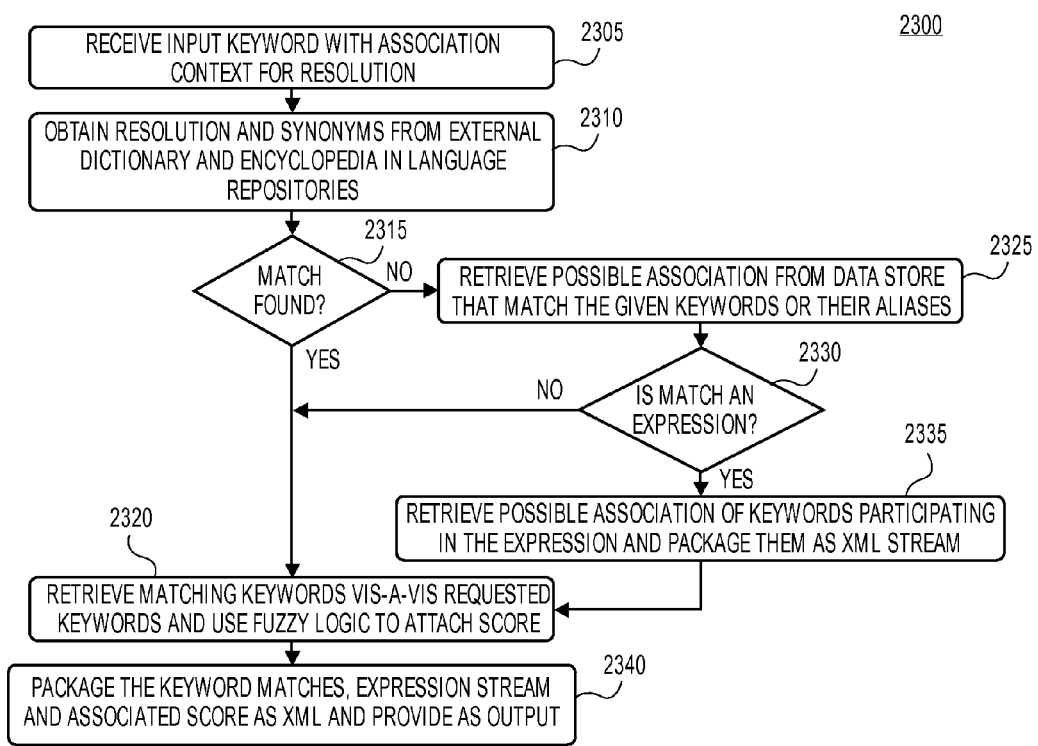
FIG. 23 is a flowchart depicting an exemplary process executed by a fuzzy engine, in accordance with an embodiment of the present invention.

Based on the current domain and contexts, the fuzzy engine 135 scores each discovered alternate keyword. For this it utilizes the synonym domain and its approximate closeness to the keyword in question. FIG. 23 provides details of one example of a process 2300 used by the fuzzy engine 135 to perform its task.

For input keywords with associated context requiring resolution (step 2305), the resolutions and synonyms may be obtained from external sources (step 2310). If a match is found (step 2315), the matching keywords are retrieved and scored (step 2320). Otherwise, possible associations that match the keywords of their aliases are retrieved from the data store (step 2325) and, if a match is found (step 2330), the possible associations of keywords participating in the expression are retrieved and included in an XML stream (step 2335). Ultimately, the packaged keyword matches, expression stream and associated score are returned (step 2340).

Figure 24:
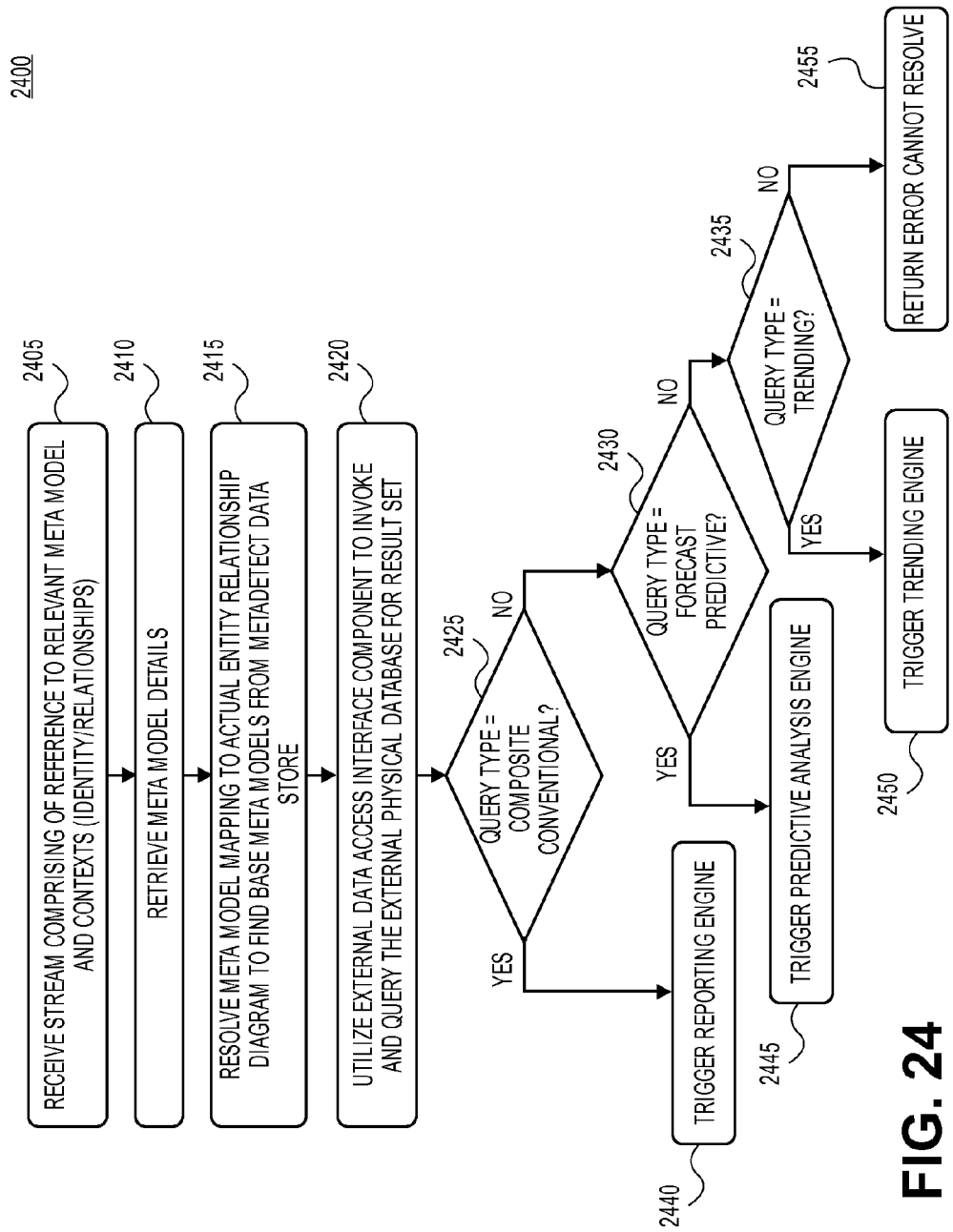
FIG. 24 is a flowchart depicting an exemplary process for categorizing a query type, in accordance with an embodiment of the present invention.

System 100 produces the output for user actions using the components described above. To present the output, system 100 offers a singular interface component called the meta model inquiry interface component 165. The meta model inquiry interface component interfaces 165 with the meta detect data store 130, meta model assembly 145, and meta model relationship manager 140 to retrieve the discovered meta model(s) from the meta detect data store 130 and pass it/them to a respective engine (e.g., reporting engine, trending engine, predictive analysis engine, etc.)—based on the query type—to route the output to a suitable channel. FIG. 24 illustrates an example of a process flow 2400 executed by the meta model inquiry interface component 165.

As shown, a received input stream includes a reference to the relevant meta model and contexts (identity/relationship) (step 2405). The meta model details are retrieved from the meta detect data store 130 (step 2410) and the meta model mapping is resolved to an entity-relationship diagram using, for example, backward progression to find the base meta model (step 2415), and external databases may be queried for their respective result sets (step 2420). This is done for all meta models referenced in the input stream, and the outputs are provided to the associated engine depending on the query type (steps 2425, 2430, and 2435).

Each of the respective engines take the result sets as input, perform processing and data reformatting and pass it to the Output Interface Module (steps 2440, 2445, and 2450). For example, when the query type is composite conventional (step 2425), the result sets may be passed to trigger reporting engine (step 2440), when the query type is forecast predictive (step 2430), the result sets may be passed to trigger predictive analysis engine (step 2445), and when the query type is trending (step 2435), the result sets may be passed to trigger trending engine (step 2450). When a match is not found, an error message is returned (step 2455). The Output Interface Module 190 further provides presentation and formatting capabilities to present the results as table, chart, graphic or raw XML format (or other desired format).

Figure 25:
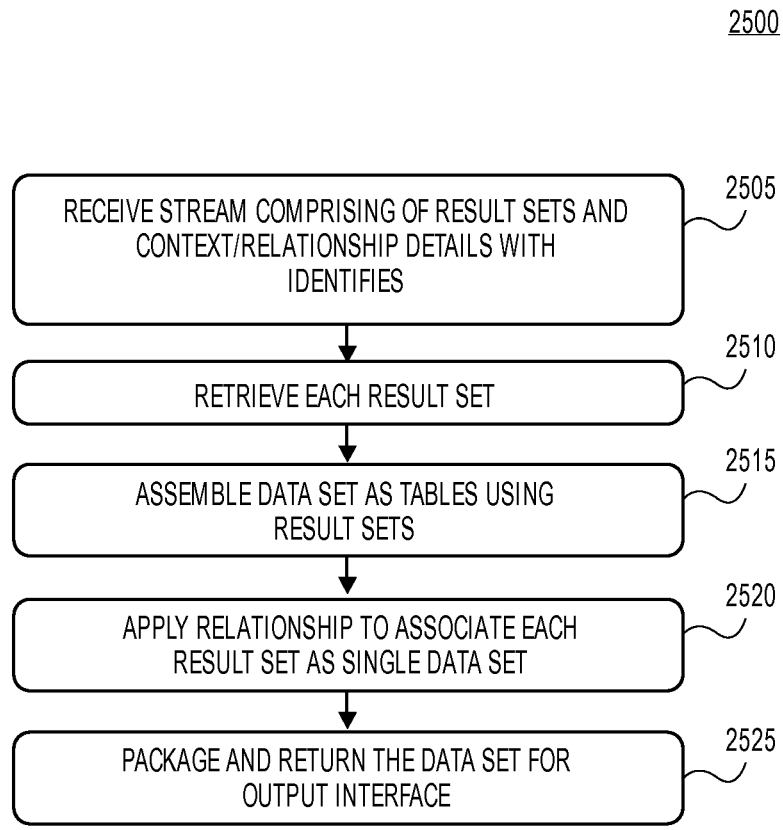
FIG. 25 is a flowchart of an exemplary process executed by a reporting engine, in accordance with an embodiment of the present invention.

FIG. 25 shows an example of a process 2500 executed by the reporting engine 170 component. From the received input stream (step 2505), each result set is retrieved (step 2510) and assembled as a table (step 2515). The relationships are applied to associate each result set as a single data set (step 2520). The resulting set of datasets is packaged and provided to the output interface module 190 (step 2525).

Figure 26:
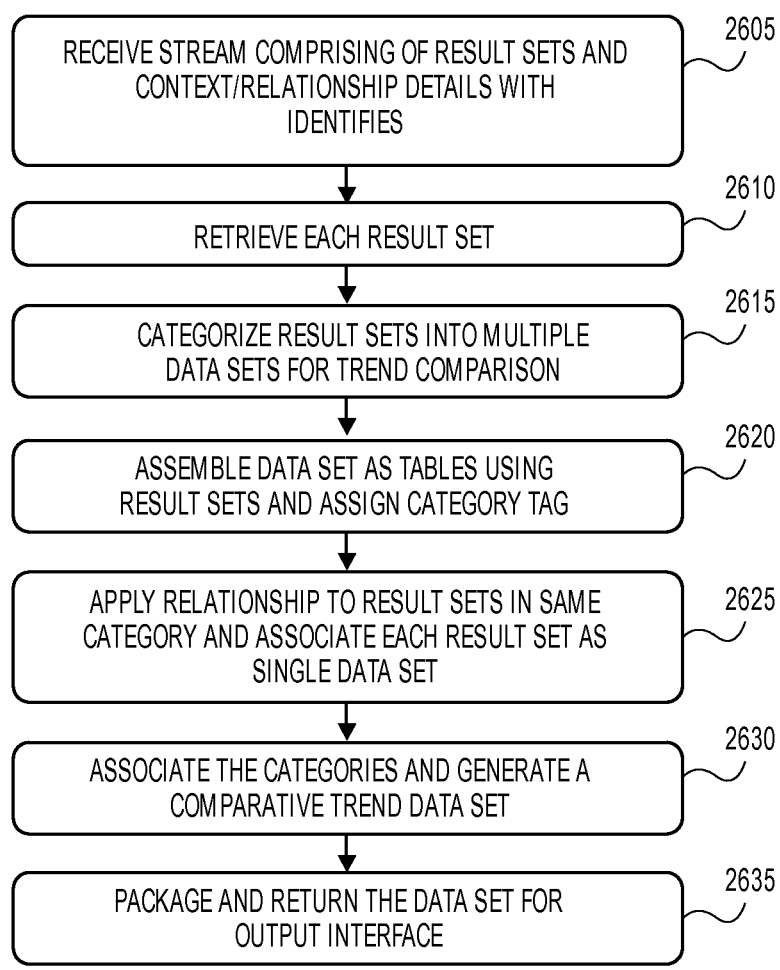
FIG. 26 is a flowchart of an exemplary process executed by a trending engine, in accordance with an embodiment of the present invention.

FIG. 26 shows an example of a process 2600 executed by the trending engine 175 component. After an input stream including result sets and context/relationship details with identifiers is received (step 2605), result sets are retrieved from the input stream (step 2610). The result sets are categorized into multiple data sets for trend comparison (step 2615) and for each result set, datasets are assembled as tables (step 2620). Relationships are applied to result sets in the same category and each result set is associated with a single data set (step 2625). Categories are associated with the result set and a comparative trend dataset is produced (step 2630), packaged, and provided to the output interface module 190 (step 2630).

Figure 27:
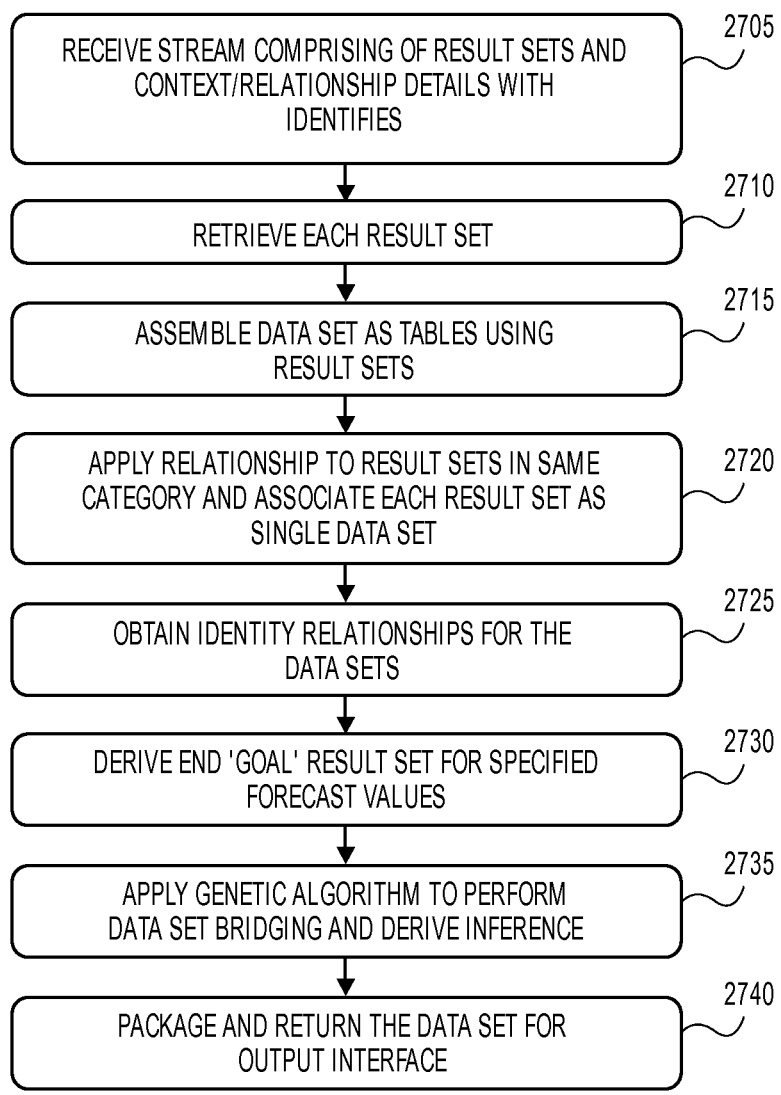
FIG. 27 is a flowchart of an exemplary process executed by a predictive analysis engine, in accordance with an embodiment of the present invention.

FIG. 27 shows an example of a process 2700 executed by predictive analysis engine with genetic algorithm support component 180. In step 2705, an input stream including result sets and context/relationship details with identities is received. Result sets are retrieved from the input stream (step 2710), and for each result set, datasets are assembled (step 2715). Relationships are applied to result sets in the same category and each result set is associated as a single dataset (step 2720). When all of the datasets have been developed, identity relationships are obtained (step 2725), end "goal" result sets are derived and forecast values are determined (step 2739) and a genetic algorithm is applied to perform data set bridging and inferencing (step 2740). The result is then packaged and provided to the output interface module 190 (step 2745).

As shown, the data clustering and organizer component 185 provides the predictive analysis engine 180 a way to derive the required goal result set. For facilitating prediction system 100 uses the datasets and their associations through the keywords, as related by expressions and/or relationships.

Thus, methods and systems for knowledge discovery and organization, and in particular such systems and methods as employ a relational meta model and domain context-based knowledge inference engine 100, have been described. The present invention finds particular application where inferences involving items stored as knowledge in a knowledge-base (e.g., the meta detect data store) are required. The items may be discovered through accesses to remote data stores. Thus, the present invention provides a system with learning capabilities—i.e., inferences based on data become available even though the original knowledge stores housing such data may not have provided such capabilities. Further, since the present system uses a discovered meta model to correlate unrelated data using genetic algorithms by finding disjointed relationships, it exhibits intelligence to accommodate variations in datasets and types of data values to derive dynamic results in the form of resultant datasets. Finally, the present system is inherently scalable inasmuch as whenever an input query or keywords cannot be resolved, the system requests external input to provide clarification. These clarifications can be in form of computational/arithmetic expressions or proportionality functions, which are stored in the knowledge-base.

What is claimed is:

1. A method, comprising:
receiving, at a processing unit of a knowledge inference engine, via an inquiry interface, user input representing a query;
processing the query to obtain available data from a relational meta model that organizes and stores information in multiple dimensions organized in a hierarchical fashion, wherein the relational meta model comprises an assembly of meta names, their aliases and dependent terms, along with relationship information associating the terms to one another, that collectively describe a meta data schema, wherein the relational meta model comprises categorized and generationally-related meta models, each generation having a specified relationship to its prior generation(s);
utilizing associations specified in the meta data schema to derive inferences among data stored in one or more data stores; and
presenting a response to the query, the response incorporating inference-derived knowledge whether or not terms used in the query match keywords used in the relational meta model.

2. The method of claim 1, wherein associations specified in the meta data schema are discovered dynamically, from Web-based data sources or other data sources.

3. The method of claim 2, wherein the associations are discovered by exposing a data store through an interface, retrieving a schema defining a manner in which data is stored in the data store, assembling the data store schema in a markup language format, and pushing the data store schema in markup language format into a meta data store.

4. The method of claim 3, wherein exposing the data store comprises:
determining whether a data source interface is available;
if a data source interface is not available, determining whether data in the data store is available in a text-based format, and, if so, employing a textual data discovery process, otherwise aborting data retrieval; otherwise
if a data source interface is available, using user-supplied configuration information to access the data store.

5. The method of claim 4, wherein the textual data discovery process comprises segmenting retrieved data using a delimiting process to group data into predefined data segments, wherein delimiter patterns used in the segmenting are retrieved from the meta data store and compared with patterns of the retrieved data to find matching delimited patterns.

6. The method of claim 5, wherein when matching delimited patterns are found, the received data is domain classified, domain keywords are associated with the data segment(s) and a delimiter pattern for the received data segment(s) and the associated domain keywords derived and stored.

7. The method of claim 1, further comprising identifying relationships between an input data stream and one or more data meta models, by:
receiving an input stream that includes keywords, domain and context information, and associated identity and relationships;
in response, retrieving one or more meta models from a meta data store, the retrieved meta models matching a domain specified or implied by the input stream;
selectively reducing the number of meta models for further processing so that only meta models matching the input stream are further processed, the selective reduction including obtaining keywords from the input stream;

comparing the keywords to category names, including aliases and definitions of the category names, of each of the meta models and, when a match is found, recording the matches; else, where no matches are found, recording the keywords without a match; and, once all of the keywords in the input stream have been evaluated, packaging the keywords and match results, including any no match results;

providing match and no match results to a meta model relationship manager and storing the results in the meta data store as mappings to apply in cases of new input data streams.

8. The method of claim 1, wherein the query is decoded by examining the query to determine a query type and the user input is processed according to the query type.

9. The method of claim 1, wherein the user input includes domain information for the query.

* * * * *